(12) United States Patent
Lee

(10) Patent No.: US 11,584,289 B2
(45) Date of Patent: Feb. 21, 2023

(54) TENT FOR VEHICLE AND VEHICLE INCLUDING THE SAME

(71) Applicant: Song Zu Lee, Seoul (KR)

(72) Inventor: Song Zu Lee, Seoul (KR)

(73) Assignee: Song Zu Lee, Los Angeles, CA (US)

( * ) Notice: Subject to any disclaimer, the term of this patent is extended or adjusted under 35 U.S.C. 154(b) by 259 days.

(21) Appl. No.: 17/124,446

(22) Filed: Dec. 16, 2020

(65) Prior Publication Data

US 2022/0185166 A1 Jun. 16, 2022

(51) Int. Cl.
*B60P 3/34* (2006.01)
*E04H 15/06* (2006.01)

(52) U.S. Cl.
CPC ................ *B60P 3/34* (2013.01); *E04H 15/06* (2013.01)

(58) Field of Classification Search
CPC .... B60P 3/34; B60P 3/39; B60P 3/341; B60P 3/343; B60P 3/38; E04H 15/06; E04H 15/008; E04H 15/08; E04H 15/18
See application file for complete search history.

(56) References Cited

U.S. PATENT DOCUMENTS

| | | | | |
|---|---|---|---|---|
| 2,938,525 A | * | 5/1960 | MacKinlay | E04H 15/06 135/904 |
| 3,438,670 A | * | 4/1969 | Salmans | E04H 15/06 135/117 |
| 4,065,166 A | * | 12/1977 | Shoemaker | B60P 3/32 296/159 |
| 4,131,310 A | * | 12/1978 | Martinsen | B60P 3/341 135/88.13 |
| 4,195,877 A | * | 4/1980 | Duda | E04F 10/0633 135/904 |
| 4,294,486 A | * | 10/1981 | Espejo | E04H 15/32 135/88.15 |
| 5,154,469 A | * | 10/1992 | Morrow | B62D 21/14 296/26.02 |
| 5,820,189 A | * | 10/1998 | Tew | B60P 3/341 296/26.11 |
| 5,864,991 A | * | 2/1999 | Burns | B60P 3/14 296/26.1 |
| 2008/0142059 A1 | * | 6/2008 | Bonebrake | B60P 3/34 135/88.1 |
| 2009/0217600 A1 | * | 9/2009 | De Azambuja | B60P 3/34 52/79.5 |
| 2011/0057474 A1 | * | 3/2011 | Cunningham | B60P 3/38 296/165 |
| 2020/0181935 A1 | * | 6/2020 | Jung | E04H 15/505 |
| 2022/0097593 A1 | * | 3/2022 | Backer | E04H 15/06 |
| 2022/0185166 A1 | * | 6/2022 | Lee | B60P 3/34 |
| 2022/0227282 A1 | * | 7/2022 | Wise | B60P 3/39 |

* cited by examiner

*Primary Examiner* — Gregory A Blankenship

(57) ABSTRACT

The present invention provides a tent for a vehicle, the tent comprising: a body frame connected to the vehicle and defining an interior space; at least one door introducing the interior space, the door comprising: a door frame; a first board located on one side of the door frame, and a second board located on the other side of the door frame, and wherein the first and the second board are connected to each other via a connecting member over one edge of the door frame, and wherein the first board comprises a first subboard, a second subboard, and a first tent cloth connecting between the first and the second subboard along the edge of the first and the second subboard.

20 Claims, 27 Drawing Sheets

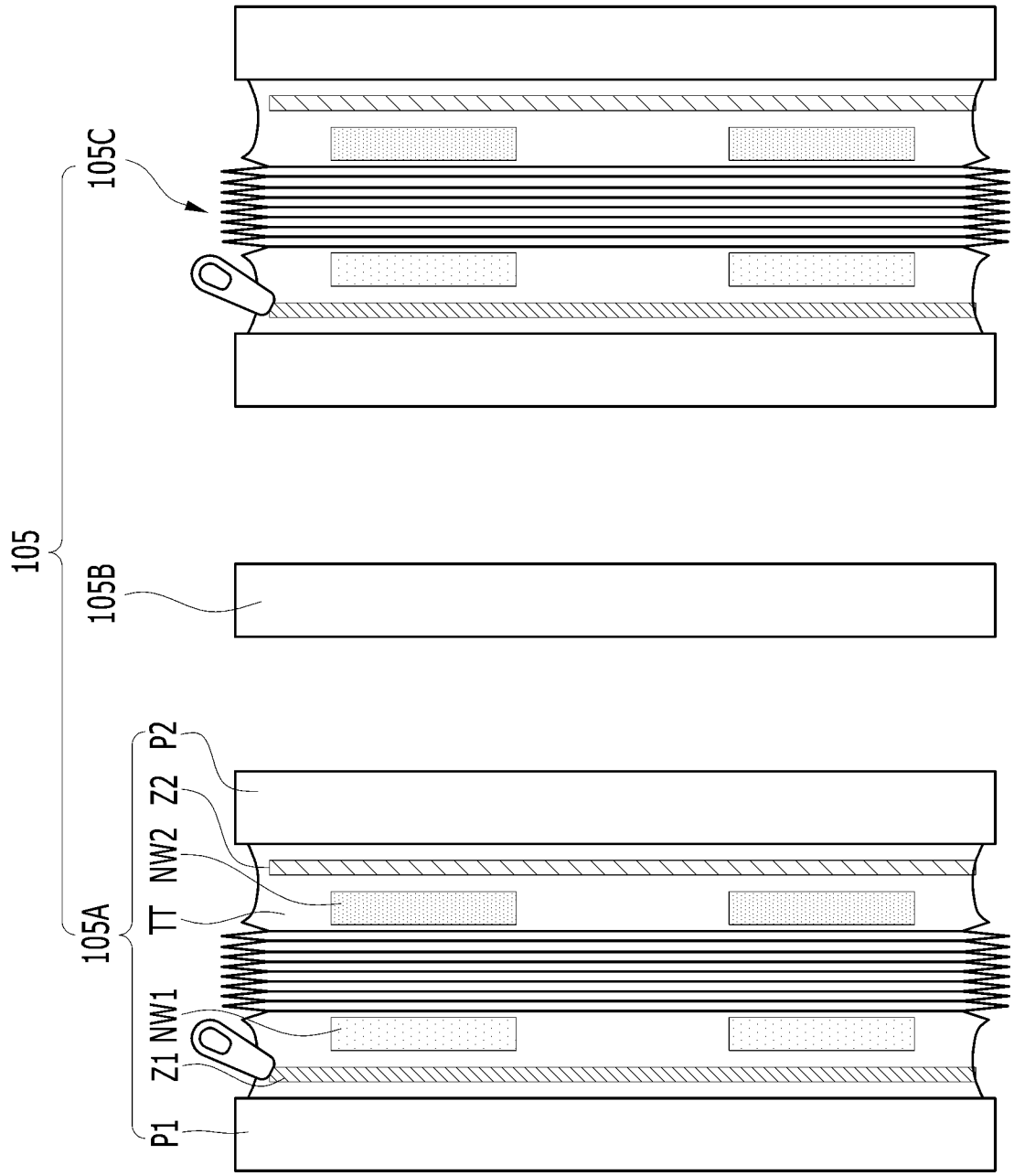

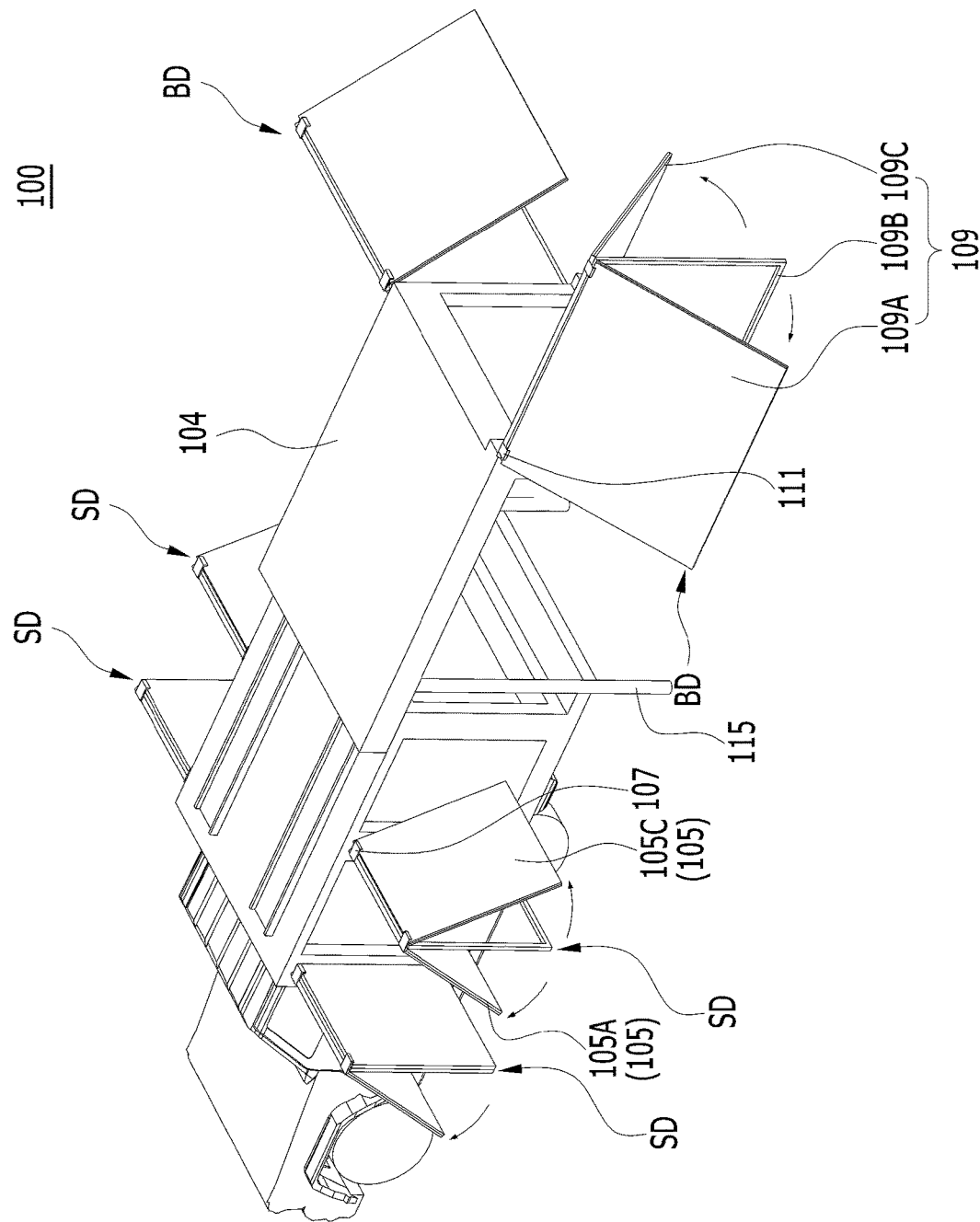

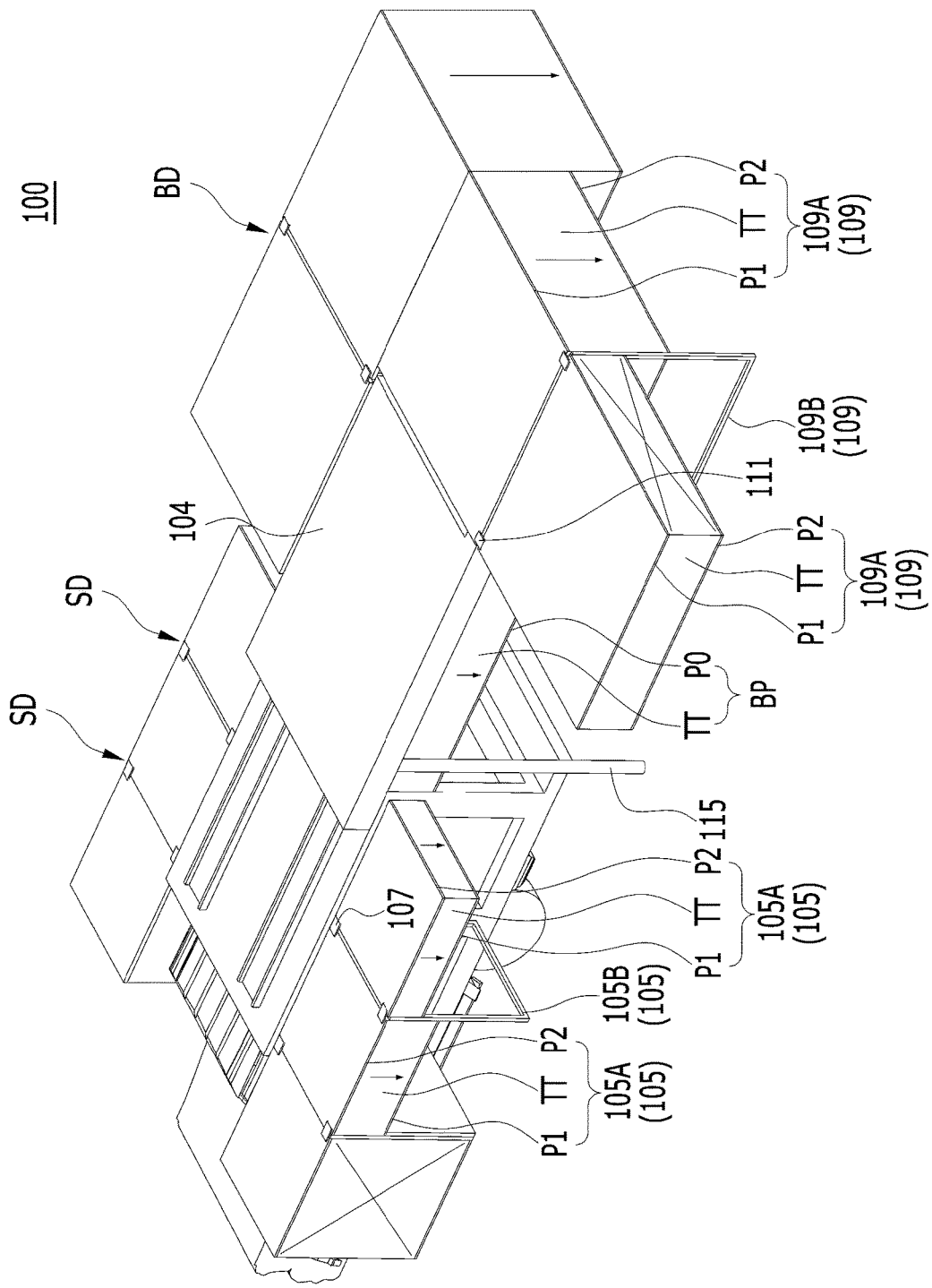

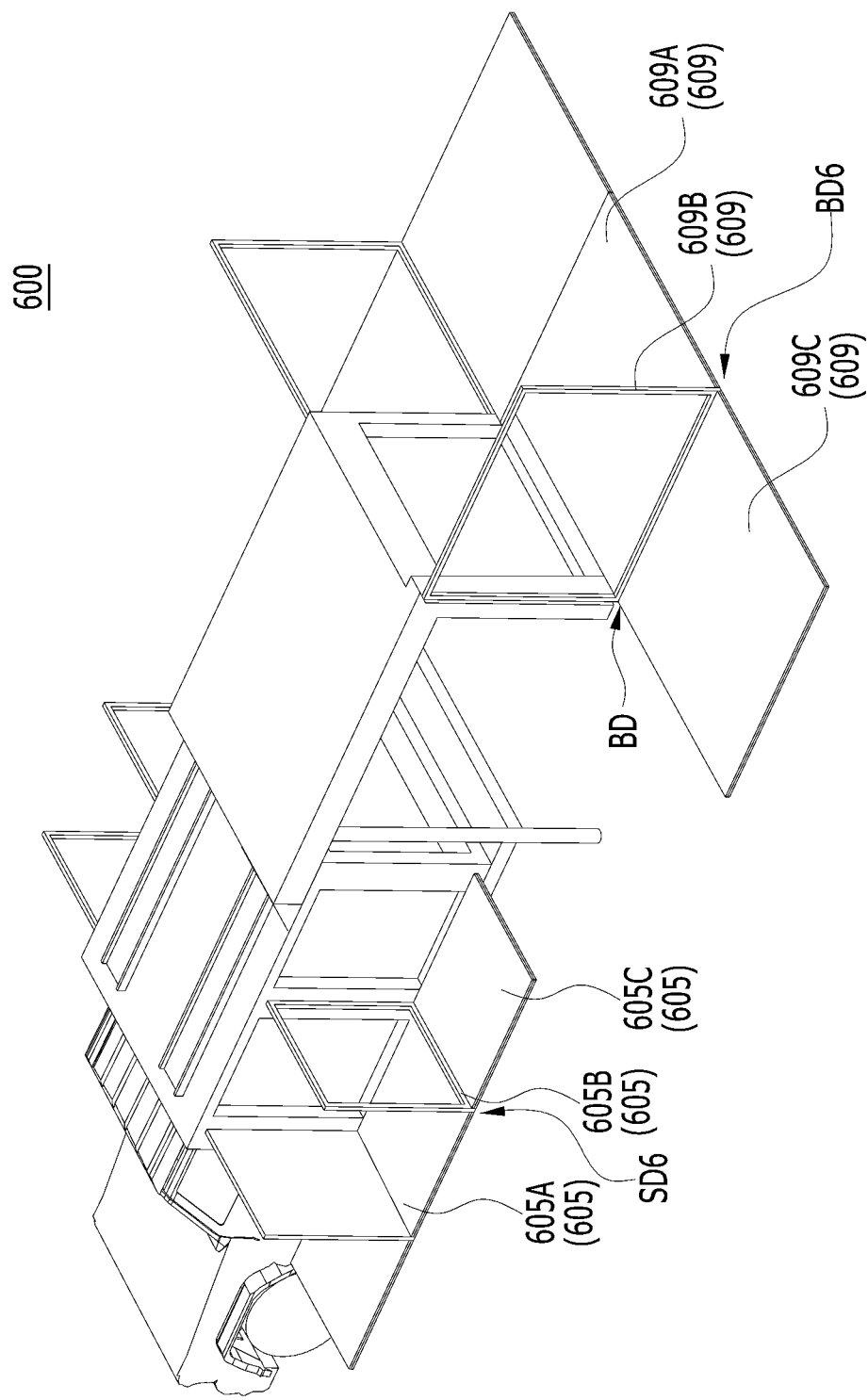

TENT FOR VEHICLE AND VEHICLE INCLUDING THE SAME

FIELD OF THE INVENTION

The present invention pertains generally to the field of a tent, and more particularly to a tent for a vehicle.

BACKGROUND OF THE INVENTION

As camping is becoming a popular outdoor recreational activity, there is an on-going interest in a tent, a caravan, a camper trailers, or a motorhome for setting up shelter in an outdoor area.

In general, there are roof top tents which are designed to be mounted to the roof top of a car. However, these kinds of tent do not provide enough interior space and have some problems when accessed via a ladder.

In addition, caravans, camper trailers, and motorhomes may provide an extended space; however, their interior spaces are still limited because these types of cars require large storage space, which may be impractical for normal people who have limited parking area in their apartments or small houses.

SUMMARY OF THE INVENTION

Embodiments of the inventive concept of the present invention provide a tent for a vehicle, the tent comprising: a body frame connected to the vehicle and defining an interior space; at least one door introducing the interior space, the door comprising: a door frame; a first board located on one side of the door frame, and a second board located on the other side of the door frame, and wherein the first and the second board are connected to each other via a connecting member over one edge of the door frame, and wherein the first board comprises a first subboard, a second subboard, and a first tent cloth connecting between the first and the second subboard along the edge of the first and the second subboard.

In one embodiment, wherein the at least one door comprises a side door and a back door.

In one embodiment, wherein the body frame comprises a side column and a rear column, and wherein the side door is connected to the side column, and the back door is connected to the rear column.

In one embodiment, wherein the body frame comprises a fixed body and an extendable roof located on the fixed body, and wherein the fixed body includes a rail on the top, and the extendable roof can be extended backward through the rail.

In one embodiment, wherein the at least one door comprises a back door, and the back door is fixed on the rear side of the extendable roof.

In one embodiment, wherein the extendable roof comprises: a plane part that is positioned on the top side of the fixed body, and a column part that is positioned at the rear side of the fixed body, and wherein the tent further comprises a second tent cloth that is connected to the bottom side of the plane part.

In one embodiment, wherein when the door opens, the first board is adjustable to form a first space defined by the first and the second subboard and the tent cloth therebetween.

In one embodiment, wherein the connecting member connects the first and the second board over the top edge of the door frame, and wherein when the door opens, the first board can pivot upward around the connecting member to the point that the first board is perpendicular to the door frame, and the first and the second subboard are detachable each other in a vertical direction.

In one embodiment, wherein the second board comprises a third subboard, a fourth subboard, and a second tent cloth connecting between the third and the fourth subboard along the edge of the third and the fourth subboard, wherein the second board is adjustable to form a second space defined by the third and the fourth subboard and the tent cloth therebetween, and wherein the second board can pivot upward around the connecting member to the point that the second board is perpendicular to the door frame, and the third and the fourth subboard are detachable each other in a vertical direction.

In one embodiment, wherein the first and the second space can be communicated through the door frame.

In one embodiment, wherein the connecting member connects the first and the second board at the bottom edge of the door frame, and wherein when the door opens, the first board can pivot downward around the connecting member to the point that the first board is perpendicular to the door frame, and the first and the second subboard are detachable each other in a vertical direction to form a second space defined by the first and the second subboard and the tent cloth therebetween.

In one embodiment, wherein the door frame further comprises a height adjusting member that adjusts heights of the first and the second board.

In one embodiment, wherein the at least one door comprises at least two side doors located on both lateral side of the body frame and at least one back door located on back side of the body frame, wherein levels of the side doors and the back door are higher than that of the body frame, and wherein a containing space is defined by the side doors and the back door on a top of the body frame.

In one embodiment, wherein the first tent cloth is compressed by an attachable member that attached to outside of the first tent cloth between the first and the second subboard.

In one embodiment, wherein the tent further comprises a trailer on which the body frame is mounted, and the trailer is connected to the vehicle.

Embodiments of the inventive concept of the present invention provide a vehicle comprising: a body frame defining an interior space, and at least one door introducing the interior space, the door comprising: a door frame; a first board located on one side of the door frame, and a second board located on the other side of the door frame, and wherein the first and the second board are connected to each other via a connecting member over one edge of the door frame, wherein the first board comprises a first subboard, a second subboard, and a first tent cloth connected between the first and the second subboard along the edge of the first and the second subboard.

In one embodiment, wherein the body frame comprises a fixed body and an extendable roof located on the fixed body, and wherein the fixed body includes a rail on the top, and the extendable roof can be extended backward through the rail.

In one embodiment, wherein the at least one door comprise a back door, and the back door is fixed on the rear side of the extendable roof.

In one embodiment, wherein the extendable roof comprises: a plane part that is positioned on the top side of the fixed body, and a column part that is positioned at the rear side of the fixed body, and the tent further comprises a second tent cloth that is connected to the bottom side of the plane part.

Embodiments of the inventive concept of the present invention provide a tent for a vehicle, A tent comprising: a body frame connected to the vehicle and defining an interior space; at least one door introducing the interior space, the door comprising: a first subboard connected to the body frame through a connecting member located on the top of the first subboard, a second subboard, and a tent cloth connected between the first and the second subboard along the edge of the first and the second subboard, and wherein when the door opens, the door can pivot upward around the connecting member to the point that the first board is perpendicular to the body frame, and the first and the second subboard are detachable each other in a vertical direction and form a space defined by the first and the second subboard and the tent cloth therebetween.

Although the present invention is briefly summarized, the fuller understanding of the invention can be obtained by the following drawings, detailed description, and appended claims.

BRIEF DESCRIPTION OF THE DRAWINGS

These and other features, aspects and advantages of the present invention will become better understood with reference to the accompanying drawings, wherein:

FIGS. 1a to 1I show drawings of a tent 100 for a vehicle according to one embodiment of the present invention.

FIGS. 1a and 1b show a top perspective view of the tent 100.

FIG. 1c shows a detailed side view of a side panel 105 of the tent 100.

FIGS. 1d to 1I show steps of setting the tent 100.

FIGS. 2a and 2c show steps of setting the tent 200.

FIG. 2b shows a detailed side view of a side panel 105 when a first and a second board 105A and 105B are elevated upward from a door frame 105B via a height adjusting member 223, 225.

FIGS. 3a, 3c, and 3d show steps of creating a compartment on a roof top of the car 300 by the side door BD3 and the back door BD3.

FIG. 3b shows a detailed side view of a side panel 305 when a first and a second board 105A and 105B are elevated upward from a door frame 305B via height adjusting members 223, 225.

FIGS. 6a to 6c show a tent 600 for a vehicle according to another embodiment of the present invention.

DETAILED DESCRIPTION EMBODIMENTS OF THE INVENTIONS

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as form "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1A:
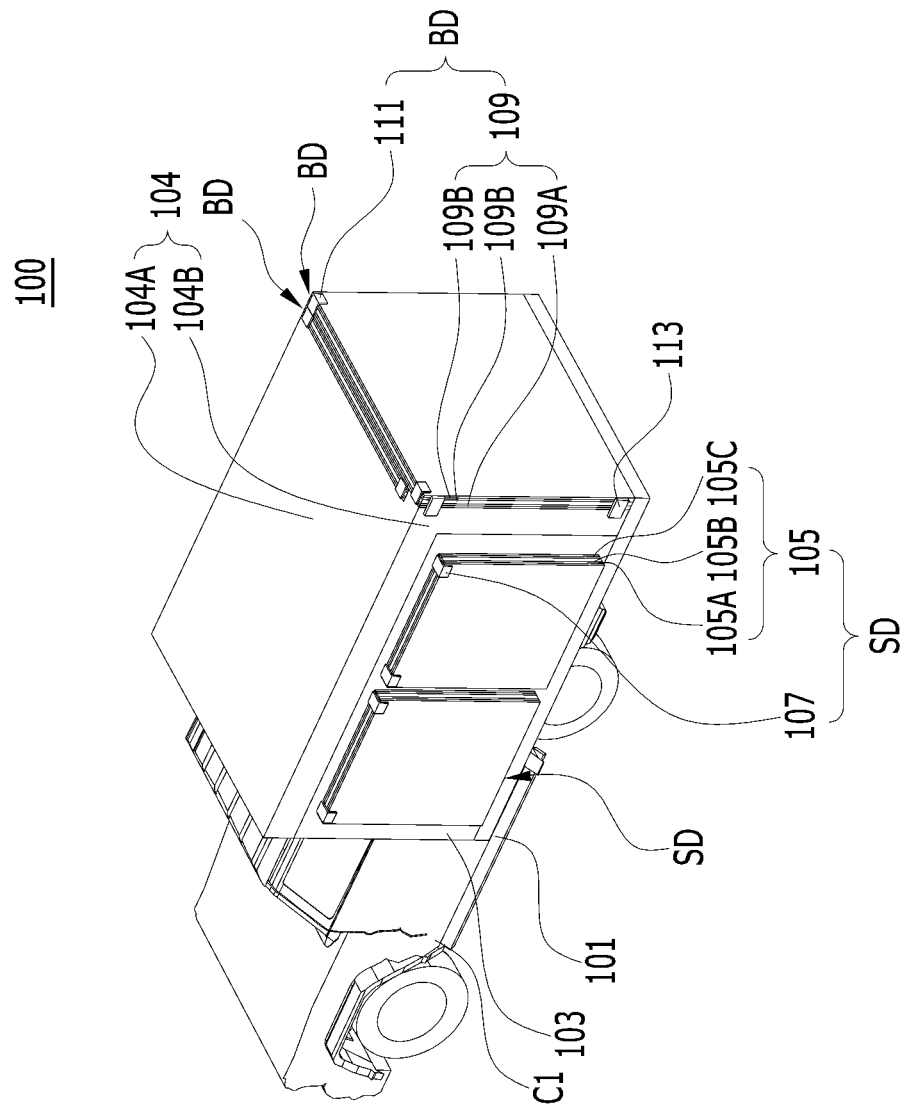
Figure 1B:
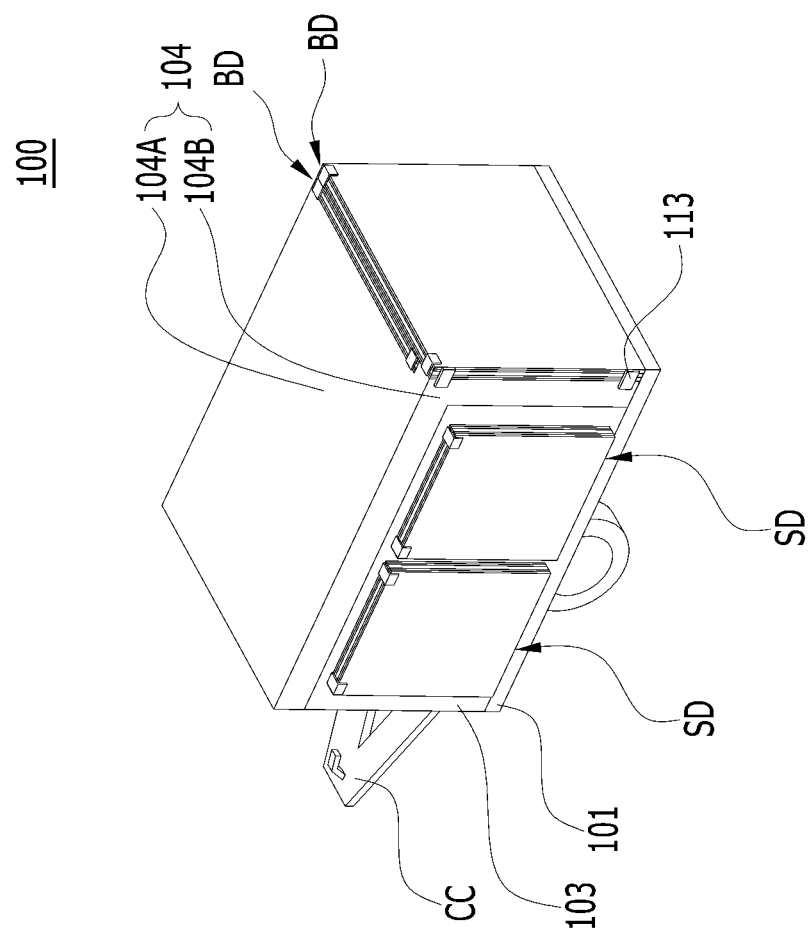

FIGS. 1a to 1I show drawings of a tent 100 for a vehicle C1 according to one embodiment of the present invention. FIGS. 1a and 1b show a top perspective view of the tent 100. FIG. 1c shows a detailed side view of a side panel 105 of the tent 100. FIGS. 1d to 1I show steps of setting the tent 100.

According to FIGS. 1a to 1c, a tent 100 may comprise a trailer 101, a body frame 103, and at least one door SD, BD. The tent 100 may be connected to the car C1 through a connecting hook CC but is not limited to. The tent 100 may be applied to various types of vehicles.

The body frame 103, 104 may comprise a fixed body 103 and an extendable roof 104. The fixed body 103 defines an interior space and has openings at lateral sides and a rear side of it. Side doors SD are installed to cover the openings at the lateral sides of the fixed body 103 and connected to the fixed body 103 through hinges (not illustrated).

Figure 1D:
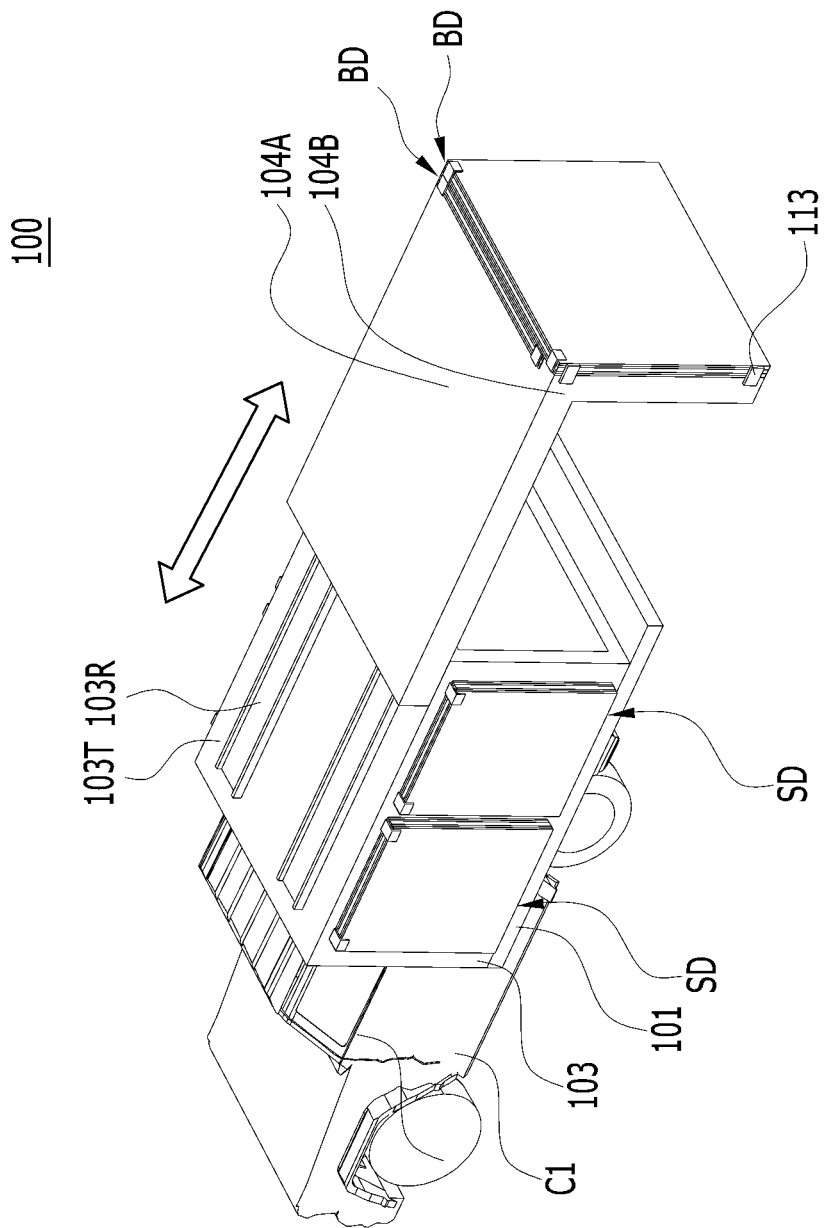

The extendable roof 104 is located on the fixed body 103. Referring to FIG. 1d together, the fixed body 103 may have a rail 103R on the top 103T. The extendable roof 104 is engaged with the fixed body 103 through the rail 103 R and can move back and forth along the rail 103R. The extendable roof 104 may comprise a plane part 104A and a column part 104B at the rear side. The column part 104B may be located along a lateral edge of the opening at the rear side of the fixed part 103. A back door BD is connected to the column part 104B through hinges 113 and covers the opening at the rear side of the fixed part 103.

In some embodiments, the tent 100 may have two back doors BD. Each of the back door BD may be connected to each column part 104B located along each lateral edge of the opening at the rear side. The two back doors BD may have overlapped each other.

In some embodiments, the extendable roof 104 may further comprise a supporting member 115.

Each of the side door SD and the back door BD has layered structure. For example, the side door SD comprises a first board 105A, a door frame 105B, and a second board 105B. The first board 105A is located on one side of the door frame 105B, and a second board 105C is located on the other side of the door frame 105B. The first and the second board 105A, 105B are connected to each other via a connecting member 107 over one edge of the door frame 105B. The connecting member 107 may be a hinge but is not limited to.

Each of the first board 105A and the second board 105B may form an independent space when it is extended. Specifically, each of the first and the second board 105A, 105B comprises a first subboard P1, a tent cloth TT, and a second subboard P2. The tent cloth TT connects between the first and the second subboard P1, P2 along the edge of the first and the second subboard P1, P2. The tent cloth TT may be compressed by at least one attachable member Z1, Z2, NW1, NW2 and occupied a small volume. The attachable member Z1, Z2, NW1, NW2 may be attached to the outside of the tent cloth TT. For example, referring to FIG. 1c, the tent cloth TT may comprise a non-woven type attachable member NW1, NW2 and a zipper type attachable member Z1, Z2 to be stored between the first and the second subboard P1, P2.

When the side door SD opens, the first and the second board 105A, 105B are adjustable to form spaces.

Figure 1E:
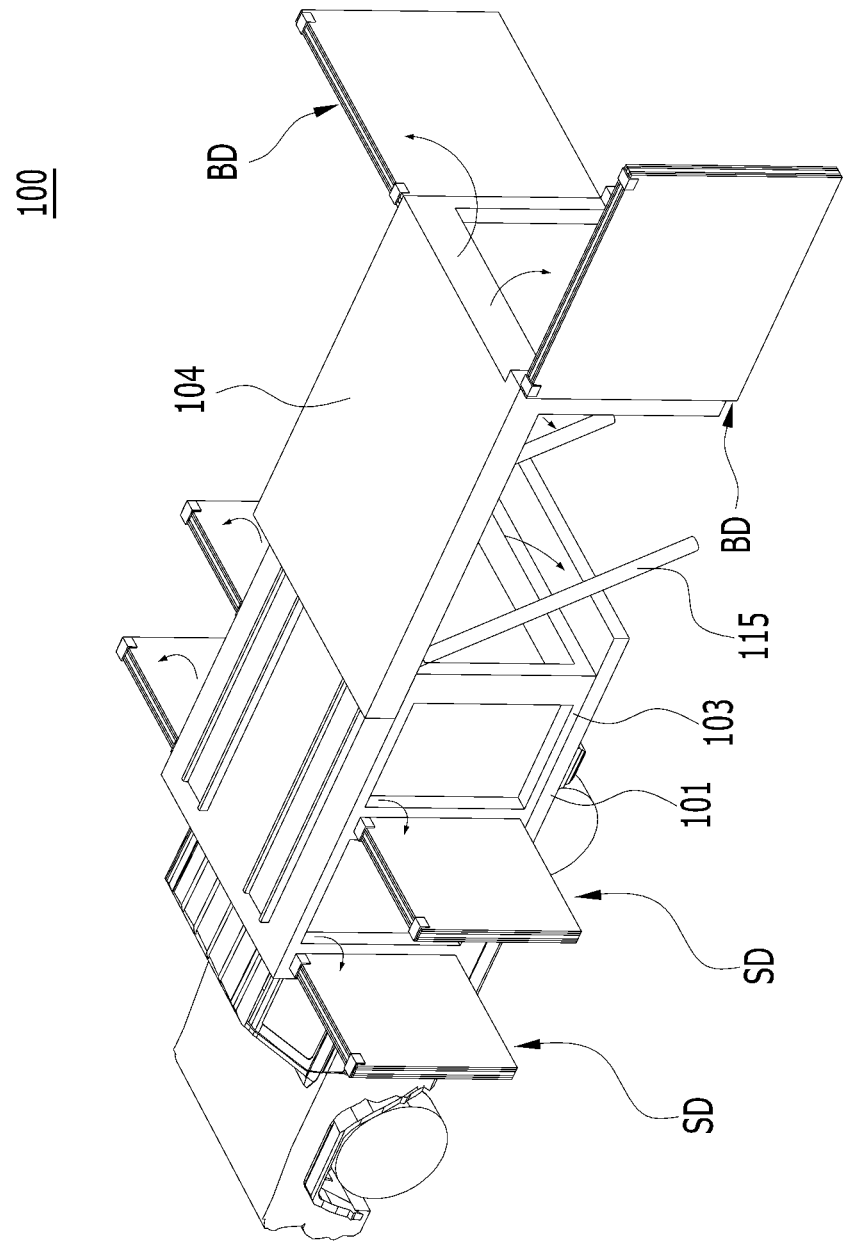
Figure 1G:
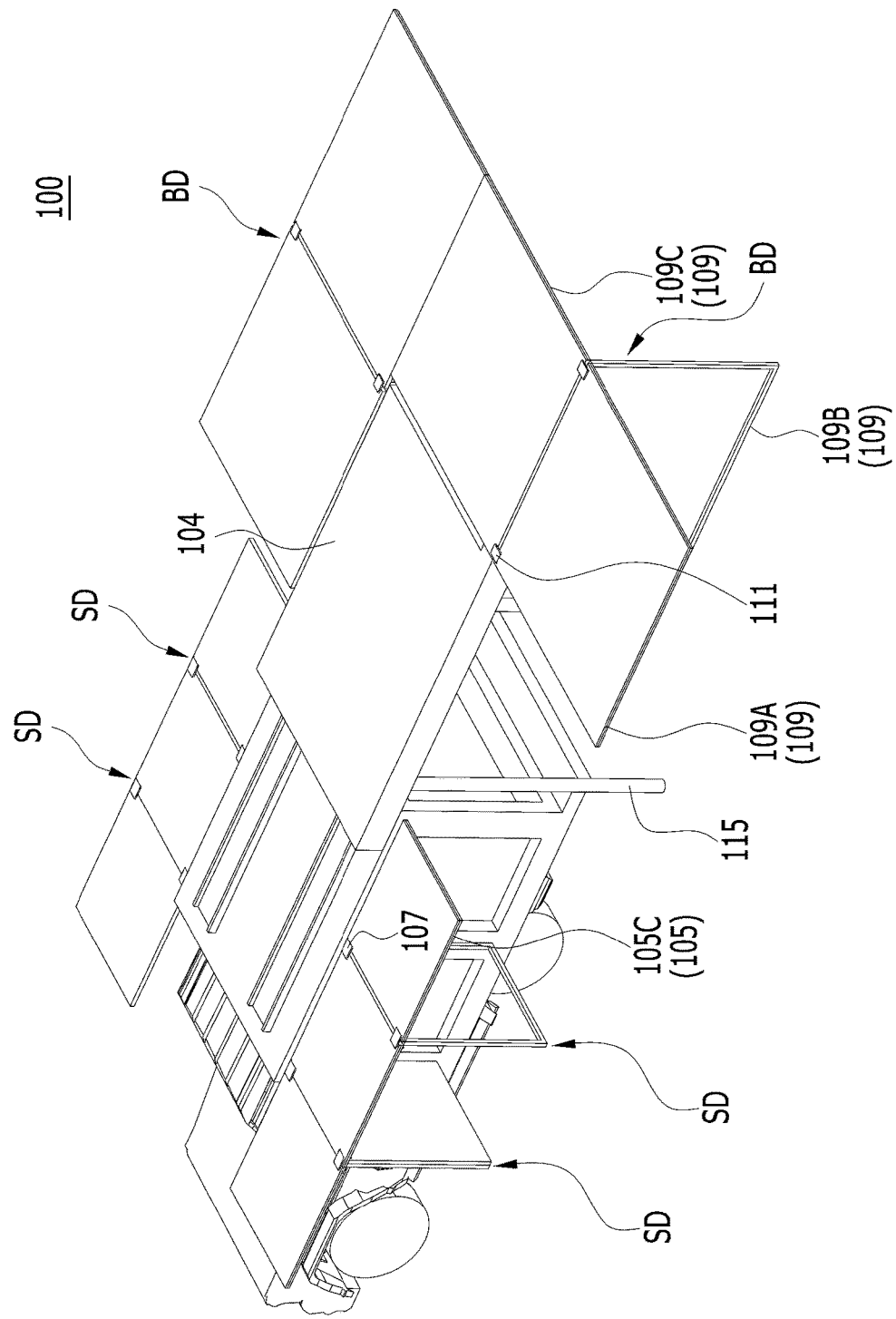

A first space formed by the first board 105A can be defined by the first and the second subboard P1, P2 and the tent cloth TT therebetween. Specifically, the connecting member 107 connects the first and the second board 105A, 105B over the top edge of the door frame 105B. Referring to FIGS. 1E, 1F, and 1G, when the side door SD opens, the first board 105A can pivot upward around the connecting member 107 to the point that the first board 105A is perpendicular to the door frame 105B. Then, the first and the second subboard P1, P2 of the first board 105A can be detachable each other in a vertical direction and form the first space.

Likewise, a second space formed by the second board 105B can be defined by the third and the fourth subboard P1, P2 and the tent cloth TT therebetween. Because the connecting member 107 connects the first and the second board 105A, 105B over the top edge of the door frame 105B, the second board 105B can pivot upward around the connecting member 107 to the point that the second board 105B is perpendicular to the door frame 105B. Then, the third and the fourth subboard P1, P2 of the second board 105B can be detachable each other in a vertical direction and form the second space.

In some embodiments, the first and the second space can be communicated through the door frame 105B. In this case, each of the tent cloth TT of the first board 105A and the tent cloth TT of the second board 105C may have openings at a side facing the door frame 105B.

Meanwhile, the back door BD also can form a third space. The back door BD comprises a first board 109A, a door frame 109B, and a second board 109B. The first board 109A is located on one side of the door frame 109B, and a second board 109C is located on the other side of the door frame 109B. The first and the second board 109A, 109B are connected to each other via a connecting member 111 over one edge of the door frame 109B. The connecting member 111 may be a hinge but is not limited to.

Each of the first board 109A and the second board 109B may form an independent space when it is extended. Referring to FIG. 1h, each of the first and the second board 109A, 109B comprises a first subboard P1, a tent cloth TT, and a second subboard P2. The tent cloth TT connects between the first and the second subboard P1, P2 along the edge of the first and the second subboard P1, P2. The tent cloth may be compressed by at least one attachable member.

Referring to FIG. 1F, when the back door BD opens, the first and the second board 109A, 109B are adjustable to form spaces.

Figure 1I:
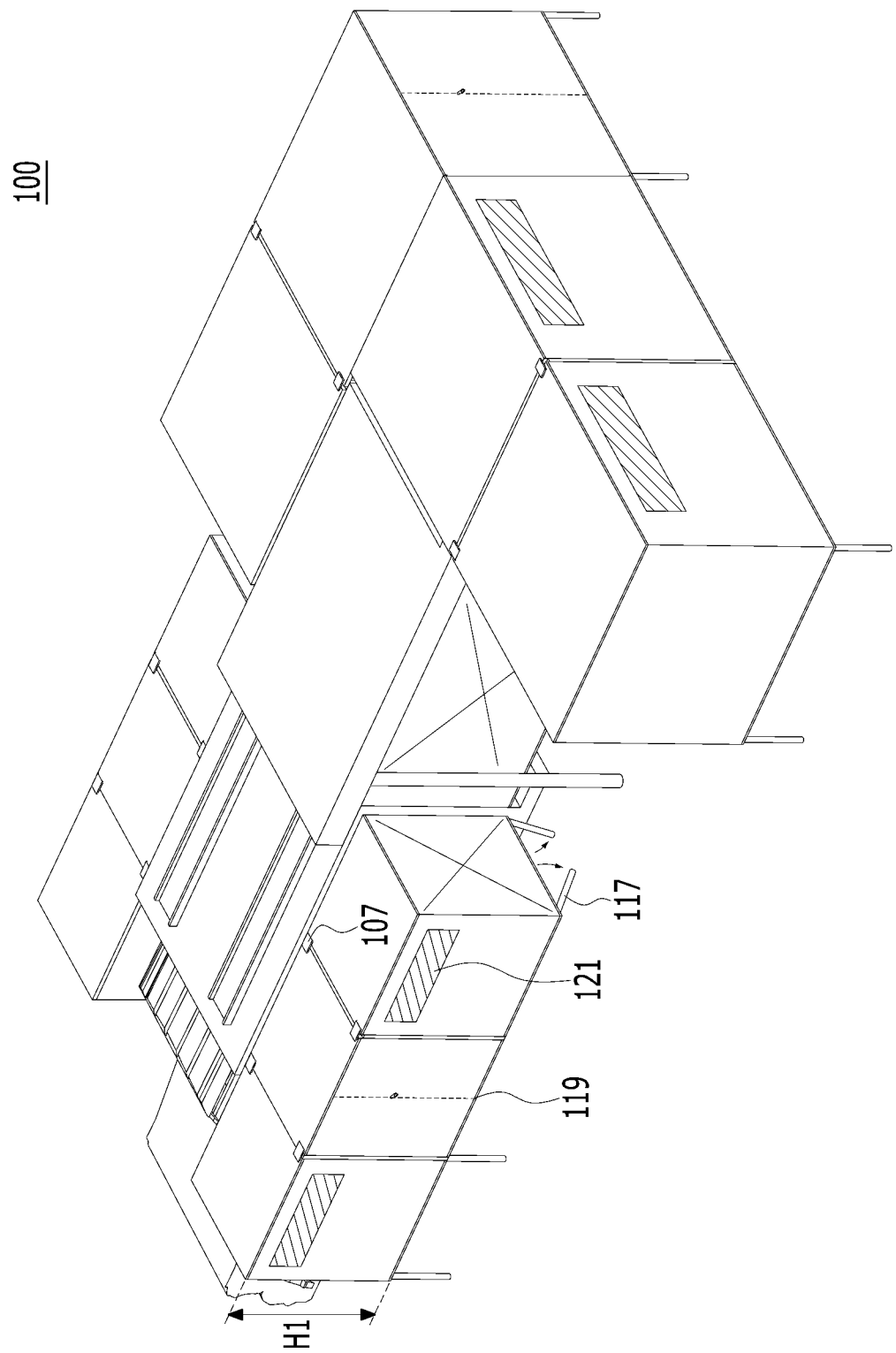

Referring to FIGS. 1H and 1I, a first space formed by the first board 109A can be defined by the first and the second subboard P1, P2 and the tent cloth TT therebetween. Specifically, the connecting member 111 connects the first and the second board 109A, 109B over the top edge of the door frame 109B. When the back door BD opens, the first board 109A can pivot upward around the connecting member 111 to the point that the first board 109A is perpendicular to the door frame 109B. Then, the first and the second subboard P1, P2 of the first board 109A can be detachable each other in a vertical direction and form the first space. Likewise, the second board 109B also can form a second space.

Meanwhile, the tent 100 may further comprise a tent cloth TT that is installed at the bottom side of the plane part 104. The tent cloth TT can be compressed by attachable members attached to the outside of the tent cloth TT. When the extendable roof 104 is extended from the fixed part 103, the bottom side of the plane part 104 can be revealed. Then, the tent cloth TT installed at the bottom side of the plane part 104 can be extended downward. In some embodiments, the tent cloth TT connected to the bottom side of the plane part 104 may be connected to another board P0.

In some embodiments, the first and the second board 105A, 105B of the side door SD and the first and the second board 109A, 109B of the back door BD may further comprise at least one of supporting member 117 to support the first and the second spaces.

The tent cloth TT may be manufactured with more than one material. For example, tent cloth TT may comprise an opaque portion using fabric and a window portion 121 using transparent material.

The tent cloth TT may further comprise an entrance using an opening and closing member 119 such as a zipper.

In FIGS. 1A to 1I, the tent 100 comprises four side doors SD and two back doors BD but the present invention is not limited to. In another embodiment, the tent 100 may have either at least one side door SD or at least one back door BD.

Figure 2A:
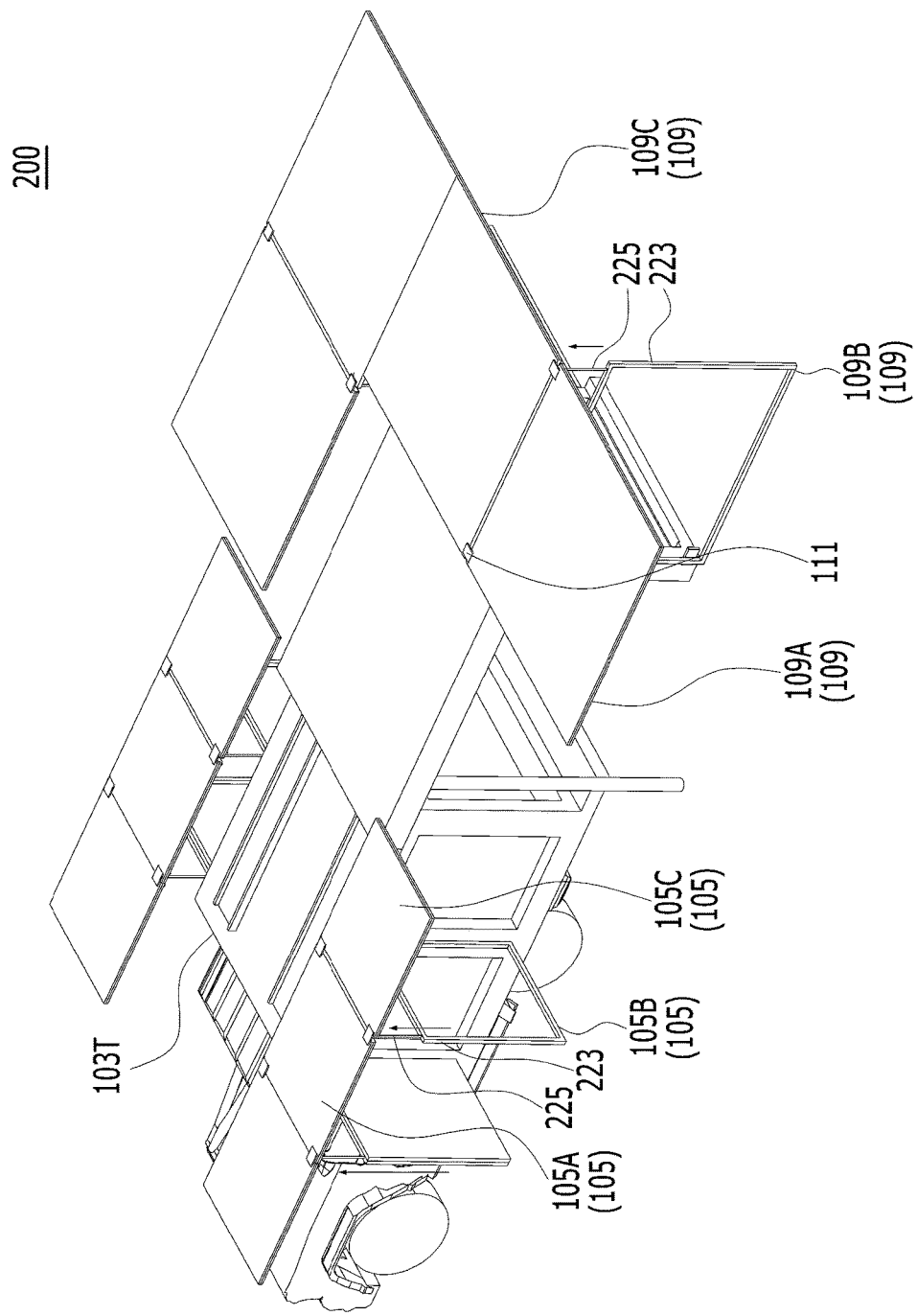
FIGS. 2a to 2c show a tent 200 for a vehicle according to another embodiment of the present invention.
Figure 2B:
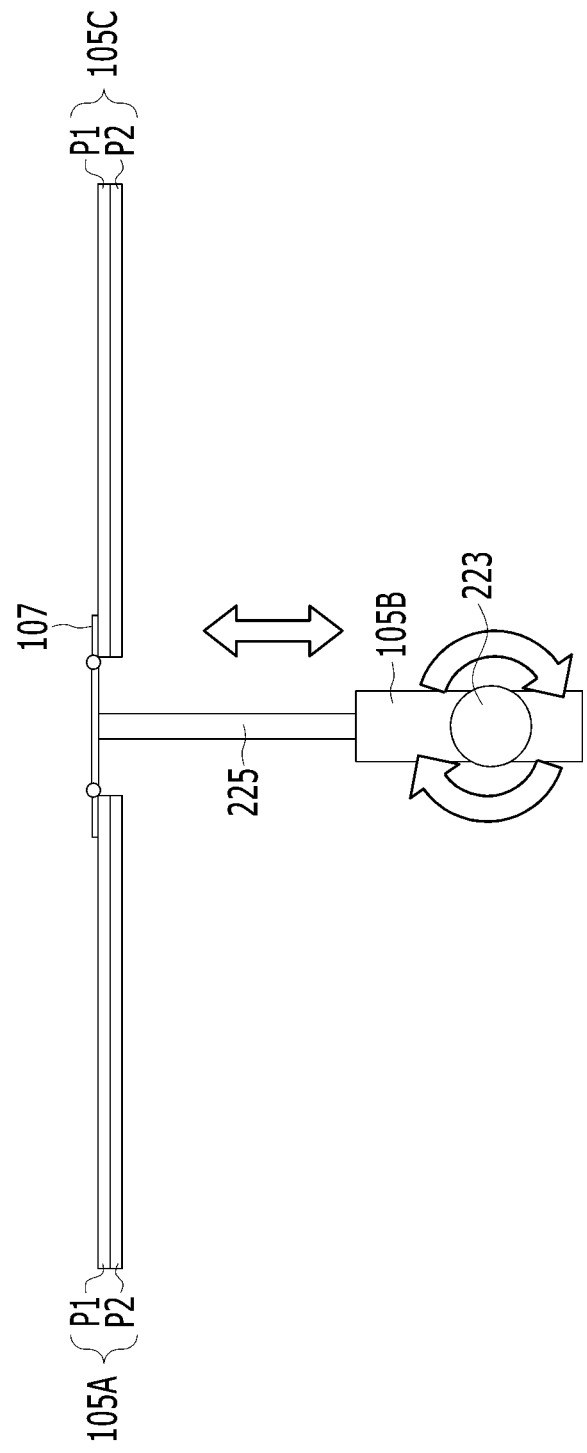
Figure 2C:
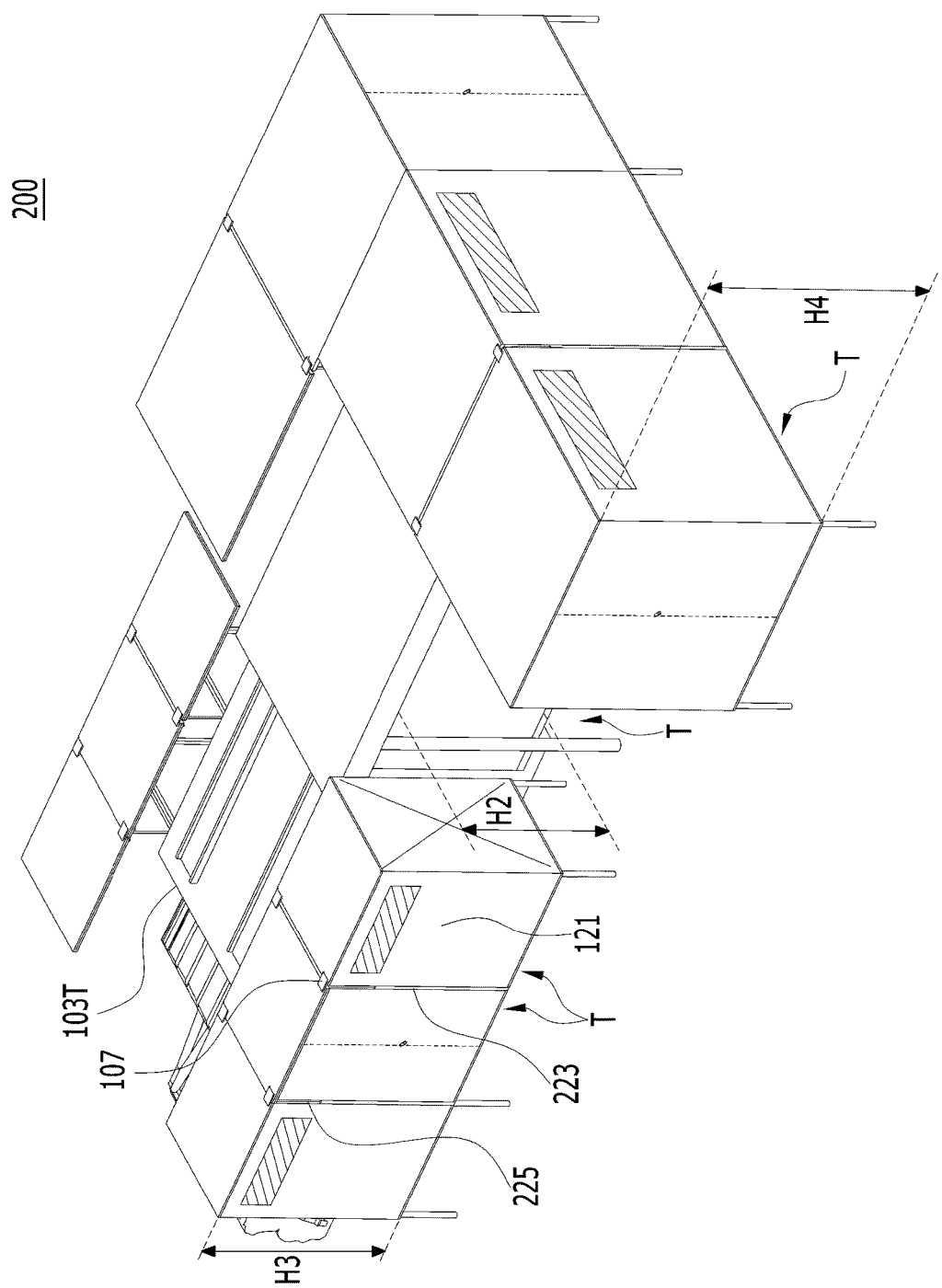

FIGS. 2a to 2c show a tent 200 for a vehicle according to another embodiment of the present invention. FIGS. 2a and 2c show steps of setting the tent 200. FIG. 2b shows a detailed side view of a side panel 105 when a first and a second board 105A and 105B are elevated upward from a door frame 105B via a height adjusting member 223, 225.

The tent 200 is similar to the tent 100 in FIGS. 1A to 1I; however, the tent 200 further comprises a height adjusting member 223, 225.

According to FIGS. 2a to 2d, a door frame 105B of a side door SD may further comprises a height adjusting member 223, 225. The height adjusting member 223, 225 can adjust heights of the first and the second board 105A, 105B by pushing a connecting member 107 between the first and the second board 105A, 105B.

Likewise, a door frame 109B of a back door BD may further comprises a height adjusting member 223, 225. The height adjusting member 223, 225 can adjust heights of the first and the second board 109A, 109B by pushing a connecting member 111 between the first and the second board 109A, 109B. The height adjusting member 223, 225 may be in contact with the connecting member 111.

If the heights of the first and the second board 105A, 105B, 109A, 109B are elevated through the height adjusting member 223, 225, the heights of the spaces T formed by the first and the second board 105A, 105B, 109A, 109B are also elevated. Referring to FIGS. 1I and 2C, the heights H1, H2 before elevation are much lower than heights H3, H4 after elevation.

In some embodiments, the height adjusting member 223, 225 may be a jackscrew but is not limited to. A height of a stand 225 can be adjusted by turning a screw 223.

Figure 3A:
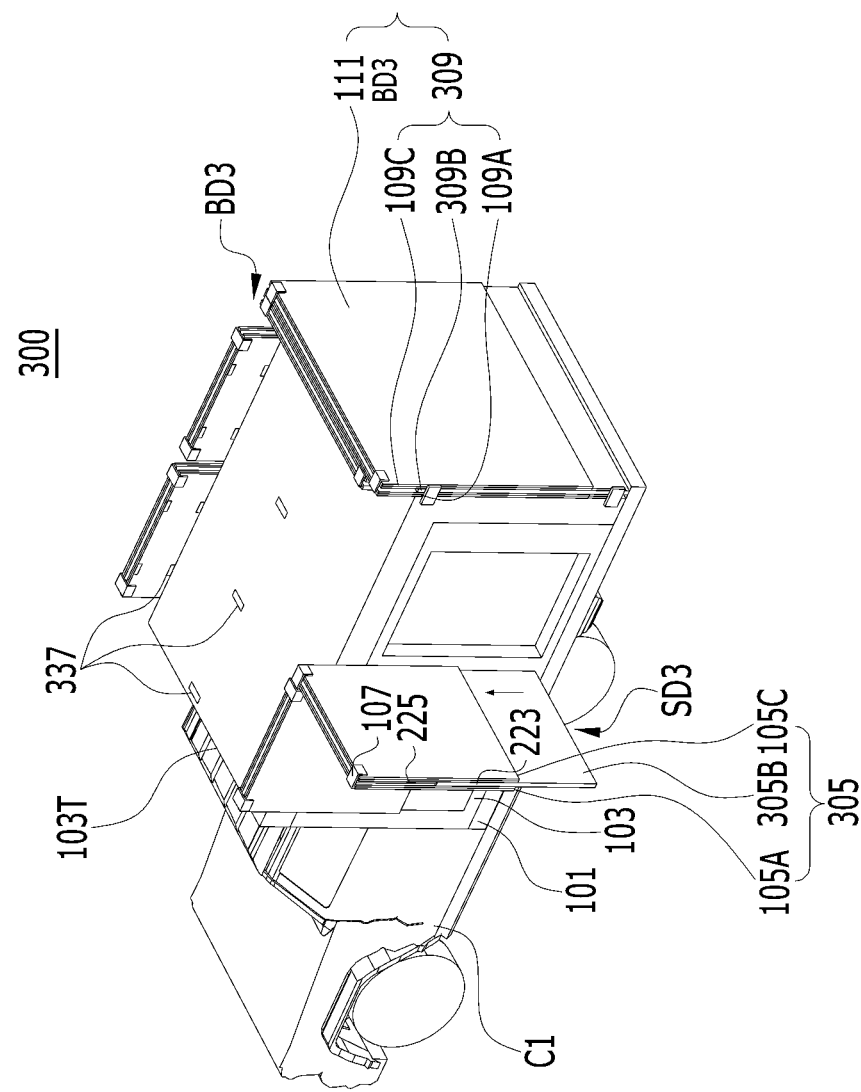
FIGS. 3a to 3d show a vehicle 300 with a side door BD3 and a back door BD3 including a tent T according to another embodiment of the present invention.
Figure 3B:
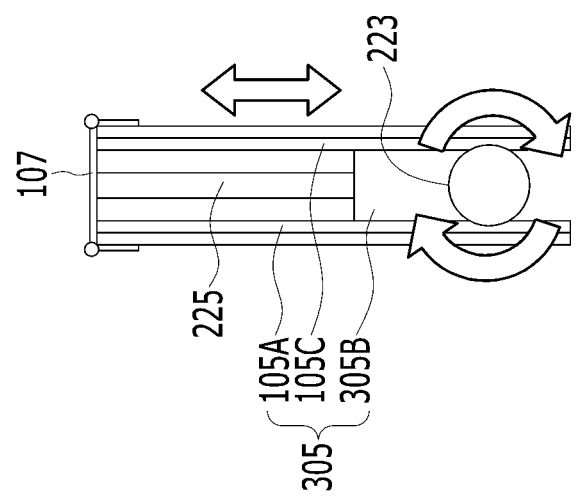
Figure 3C:
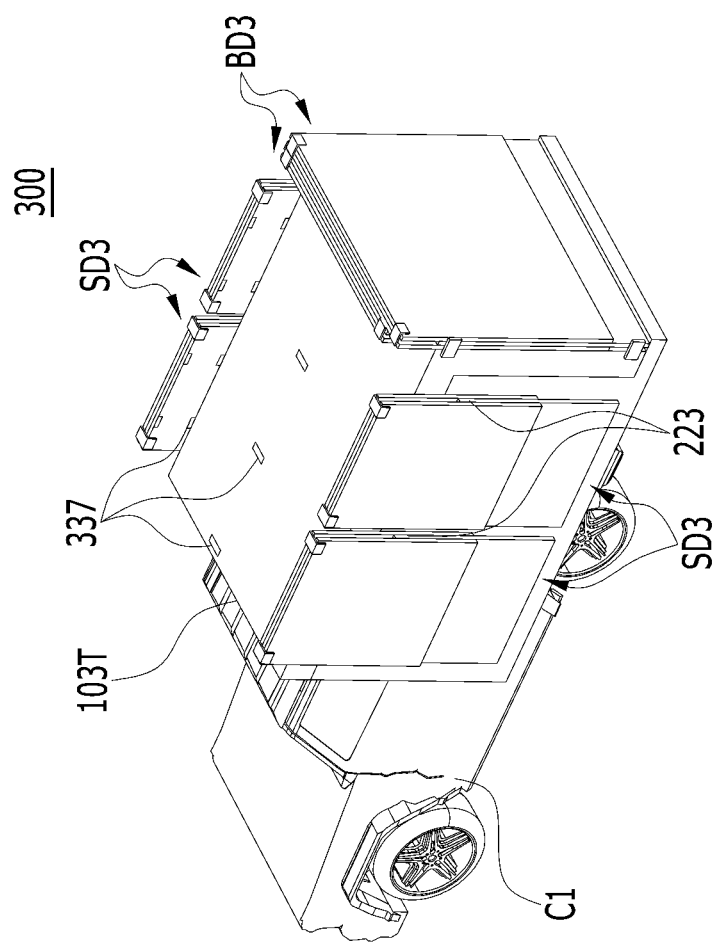
Figure 3D:
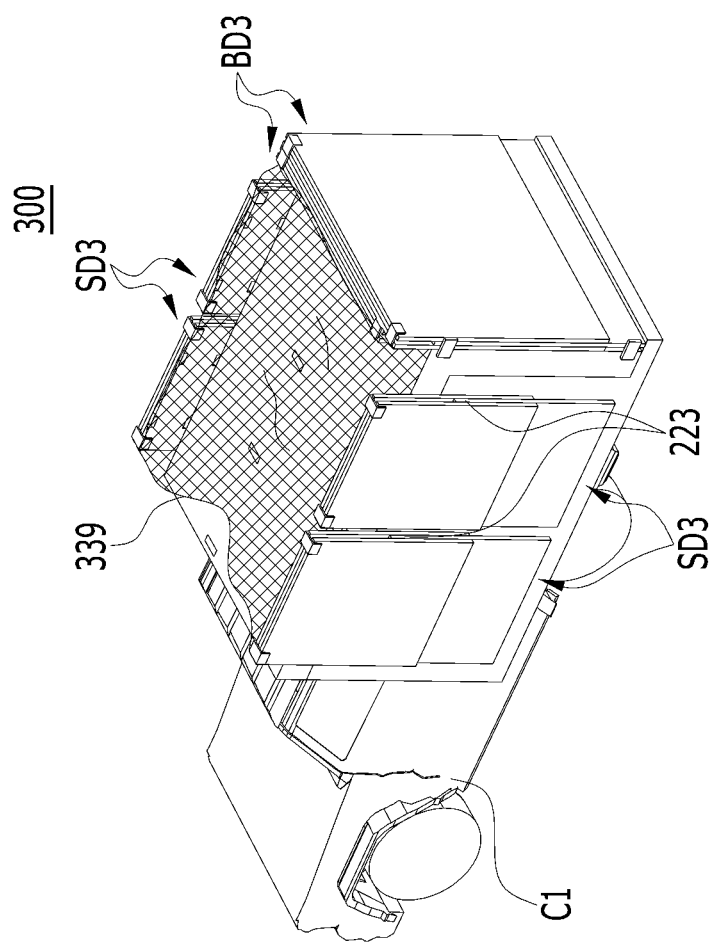

FIGS. 3a to 3d show a vehicle 300 with a side door BD3 and a back door BD3 including a tent cloth TT according to another embodiment of the present invention. FIGS. 3a, 3c, and 3d show steps of creating a compartment on a roof top of the car 300 by the side door BD3 and the back door BD3. FIG. 3b shows a detailed side view of a side panel 305 when a first and a second board 105A and 105B are elevated upward from a door frame 305B via height adjusting members 223, 225.

The tent 300 is similar to the tent 200 in FIGS. 2A to 1D; however, the tent 300 further comprises a containing space defined by the side doors SD and the back door BD on a top of the body frame 103.

According to FIGS. 3a to 3d, if door flames 305B, 309B are elevated through the height adjusting member 223, 225, the heights of the first and the second board 105A, 105C, 109A, 109C are also elevated. Accordingly, the levels of the side doors SD3 and the back door BD3 are higher than that of the body frame 103. Thus, a containing space can be defined by the side doors SD3 and the back door BD3 on a top of the body frame 103.

The containing space can be used to store load such as baggage or camping equipment. The tent 300 further comprise a covering 339 and fastening members 337. The covering 339 can be used to cover the load on the containing space. The fastening members 337 may be installed on a top side 103T of the body frame 103, the side door SD3, and the back door BD3. The fastening members 337 can be used to secure the covering 339.

Figure 4A:
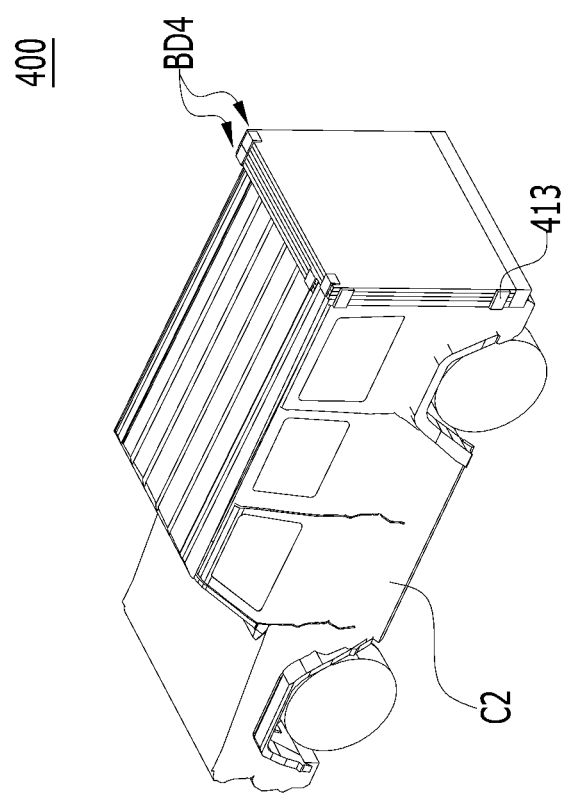
FIGS. 4a and 4b show a vehicle 400 with a back door BD4 including a tent T according to another embodiment of the present invention.
Figure 4B:
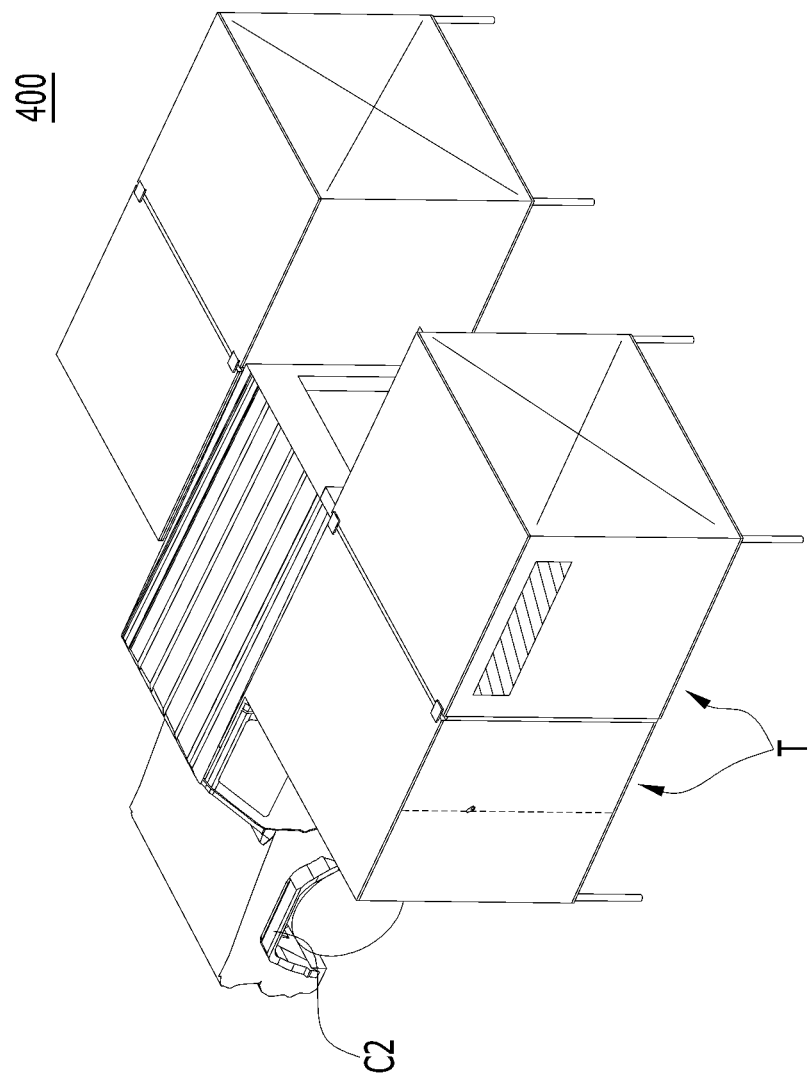

FIGS. 4a and 4b show a vehicle 400 with a back door BD4 including a tent cloth TT according to another embodiment of the present invention.

According to FIGS. 4a and 4b, a vehicle C2 comprises a body frame defining an interior space and a back door BD4 introducing the interior space.

The back door BD4 is connected to the body frame with a hinge 413. The vehicle C2 may comprise two back doors BD4 which are overlapped each other but is not limited to.

The detailed structure of the back door BD4 is same as described before. The back door BD4 can form a tent space. Each of the back doors BD4 comprises a first board, a door frame, and a second board. The first board is located on one side of the door frame, and a second board is located on the other side of the door frame. The first and the second board 109A, 109B are connected to each other via a connecting member over one edge of the door frame.

Each of the first and the second board forms an independent space when it is extended. Each of the first and the second board comprises a first and second subboard and a tent cloth. When the back door BD4 opens, a user can set up a tent 400 by detaching between first and second subboard.

Figure 5A:
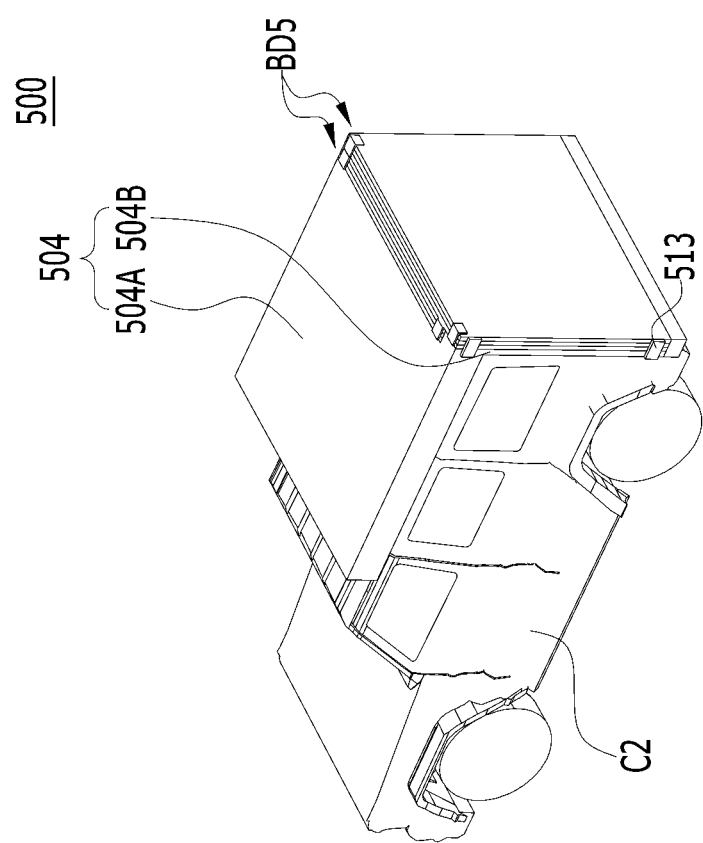
FIGS. 5a to 5c show a vehicle 500 with an extendable roof 504 and a back door BD5 including tents T according to another embodiment of the present invention.
Figure 5B:
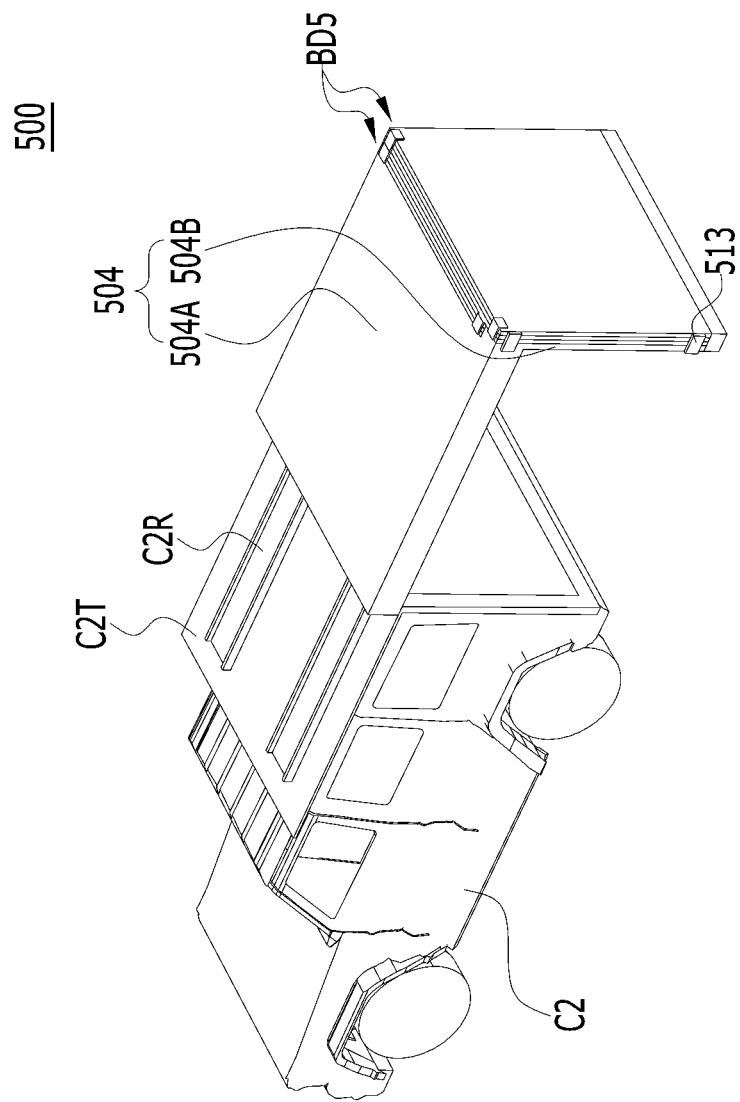
Figure 5C:
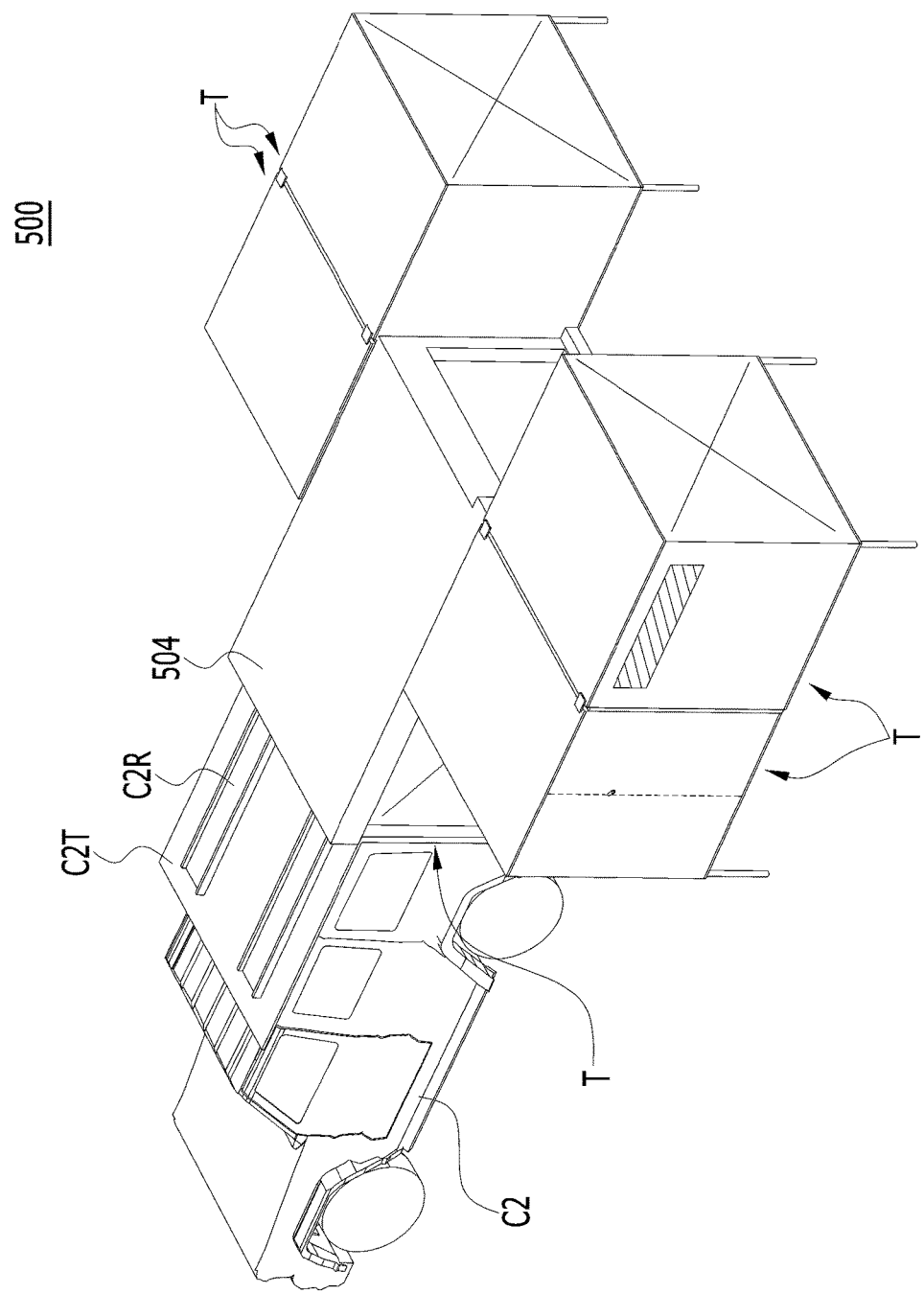

FIGS. 5a and 5b show a vehicle 500 with an extendable roof 504 and a back door BD5 including tent cloth TT according to another embodiment of the present invention.

The vehicle 500 is similar to the vehicle 400 in FIGS. 4A to 4B; however, the vehicle 500 further comprises an extendable roof C2T and the back door BD5 is connected to the extendable roof C2T.

According to FIGS. 5a and 5b, a vehicle C2 comprises a body frame defining an interior space and a back door BD4 introducing the interior space.

The body frame may comprise a fixed body and an extendable roof 504. The extendable roof 504 is located on the fixed body. The fixed body may have a rail C2R on the top 503T. The extendable roof 504 is engaged with the fixed body through the rail C2R and can move back and forth along the rail C2R. The extendable roof 504 may comprise a plane part 504A and a column part 504B at the rear side. The column part 504B may be located along a lateral edge of an opening at the rear side of the fixed part. A back door BD5 is connected to the column part 504B through hinges 513 and covers the opening. The vehicle C2 may comprise two back doors BD5 which are overlapped each other but is not limited to.

The back door BD4 can form a plurality of tent spaces. In addition, the vehicle 500 may further comprise a tent cloth that is installed at the bottom side of the plane part 504. When the extendable roof 504 is extended from the fixed part, the bottom side of the plane part 504 can be revealed. Then, the tent cloth installed at the bottom side of the plane part 504 can be extended downward. In some embodiments, the tent cloth connected to the bottom side of the plane part 504 may be connected to another board.

Figure 6B:
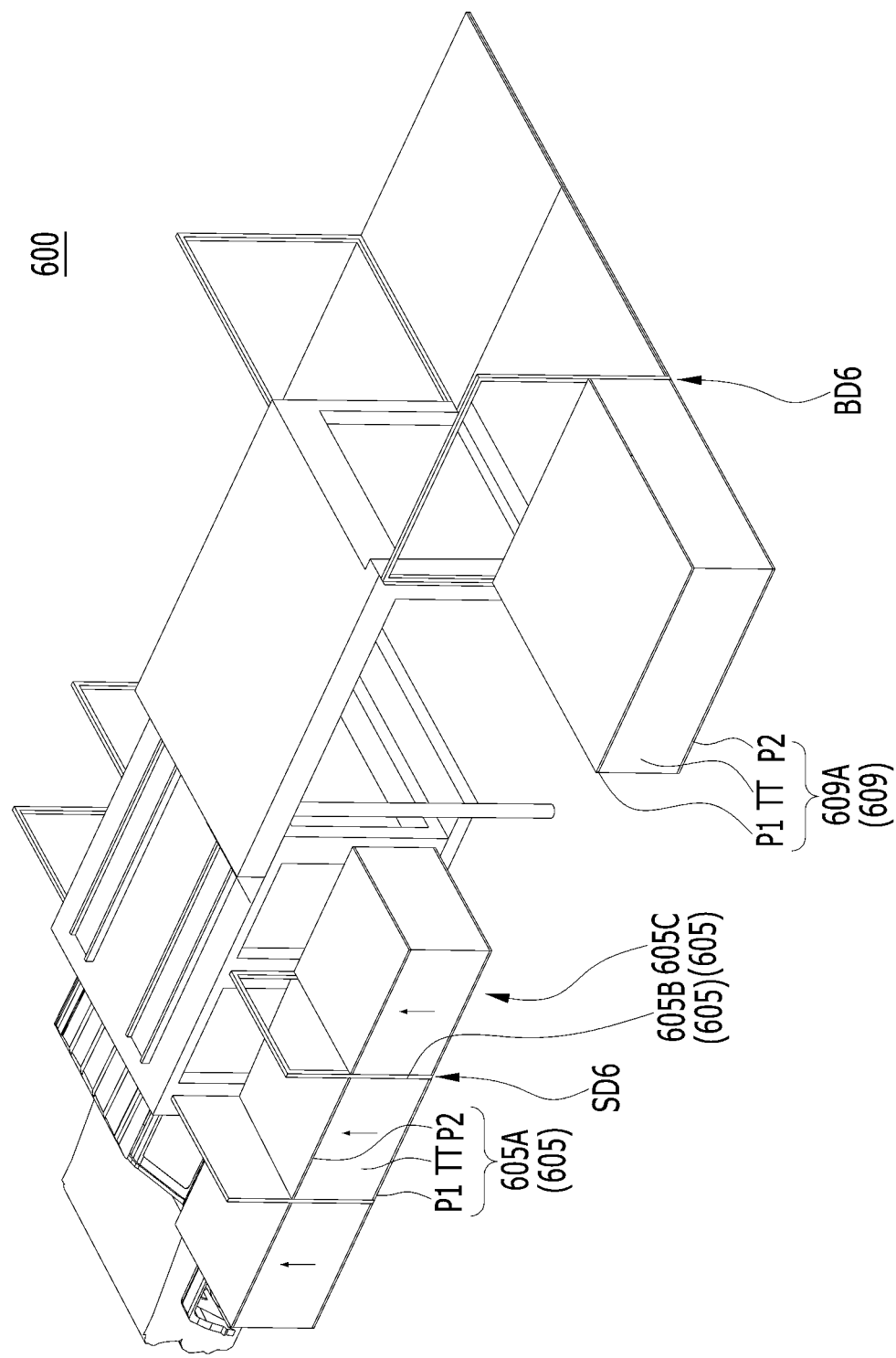
Figure 6C:
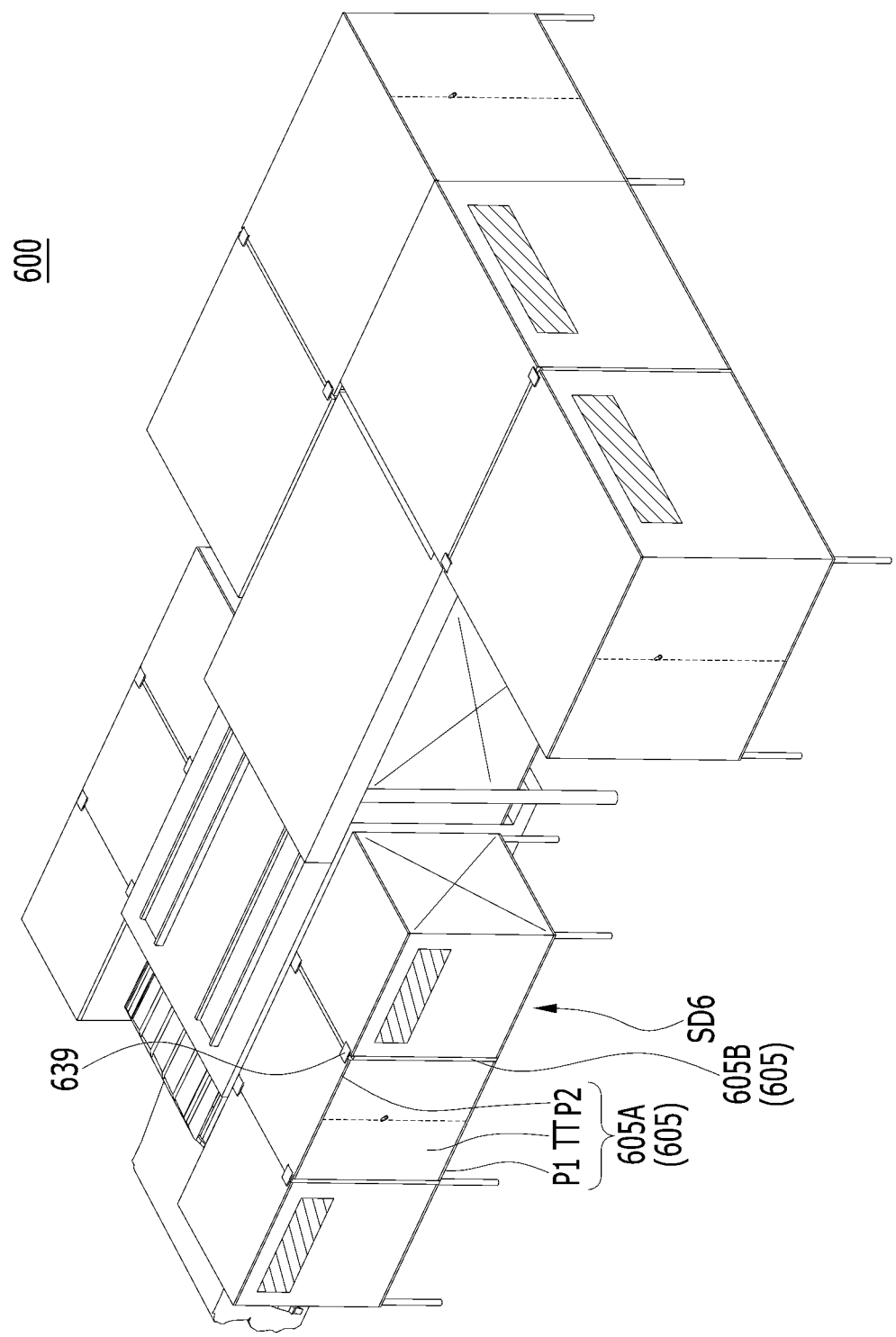

FIGS. 6a to 6c show a tent 600 for a vehicle according to another embodiment of the present invention.

The tent 600 is similar to the tent 100 in FIGS. 1A to 1I; however, the tent 600 further comprises a height adjusting member 223, 225.

According to FIGS. 6a to 6c, the connecting member connects the first and the second board 605A, 605C of a side door SD6 at the bottom edge of the door frame 605B. In FIG. 6B, the connecting member is located below the first and the second board 605A, 605C and hidden by them. A connection between the connecting member in the tent 600 and the first and the second board 605A, 605C are same as those in FIG. 1G, 1H, 1I. However, the connection in the tent 600 further comprises between the connecting member in the tent 600 and the door frame 605B. Thus, the connecting member in the tent 600 connects to a bottom edge of the door frame 605B; at the same time, the connecting member in the tent 600 connects to each of the first and the second board 605A, 605C.

Accordingly, when the side door SD6 opens, the first board 605A can pivot downward around the connecting member to the point that the first board 605A is perpendicular to the door frame 605B. Then, the first and the second subboard P1, P2 are detachable each other in a vertical direction to form a space defined by the first and the second subboard P1, P2 and the tent cloth TT therebetween.

Figure 7A:
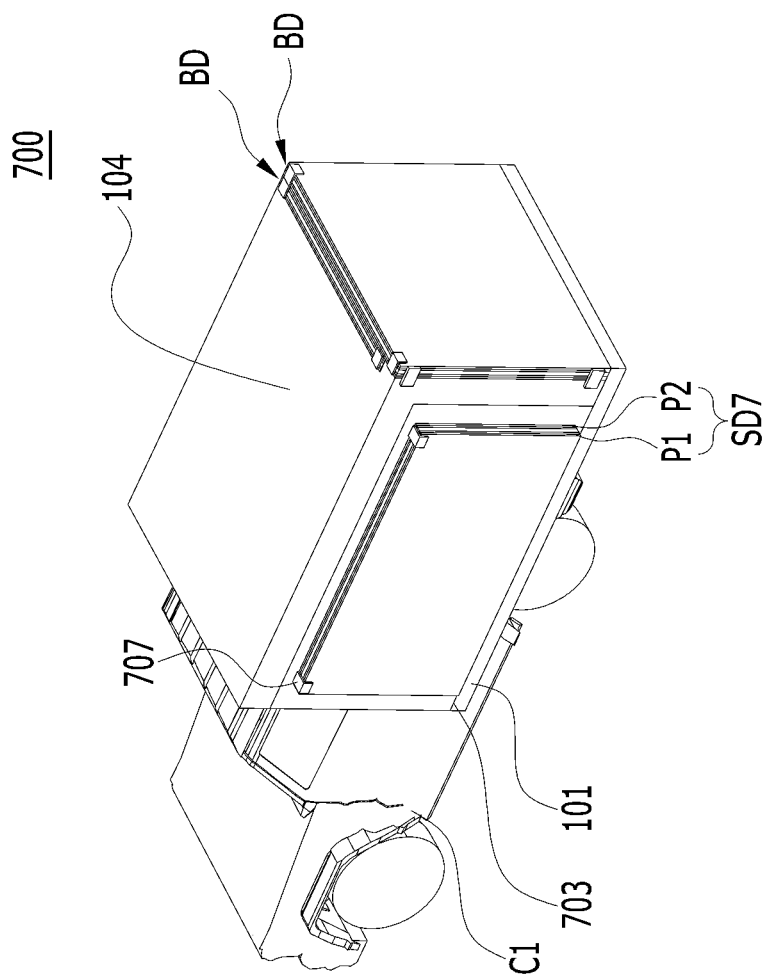
FIGS. 7a to 7c show a tent 700 for a vehicle according to another embodiment of the present invention.
Figure 7B:
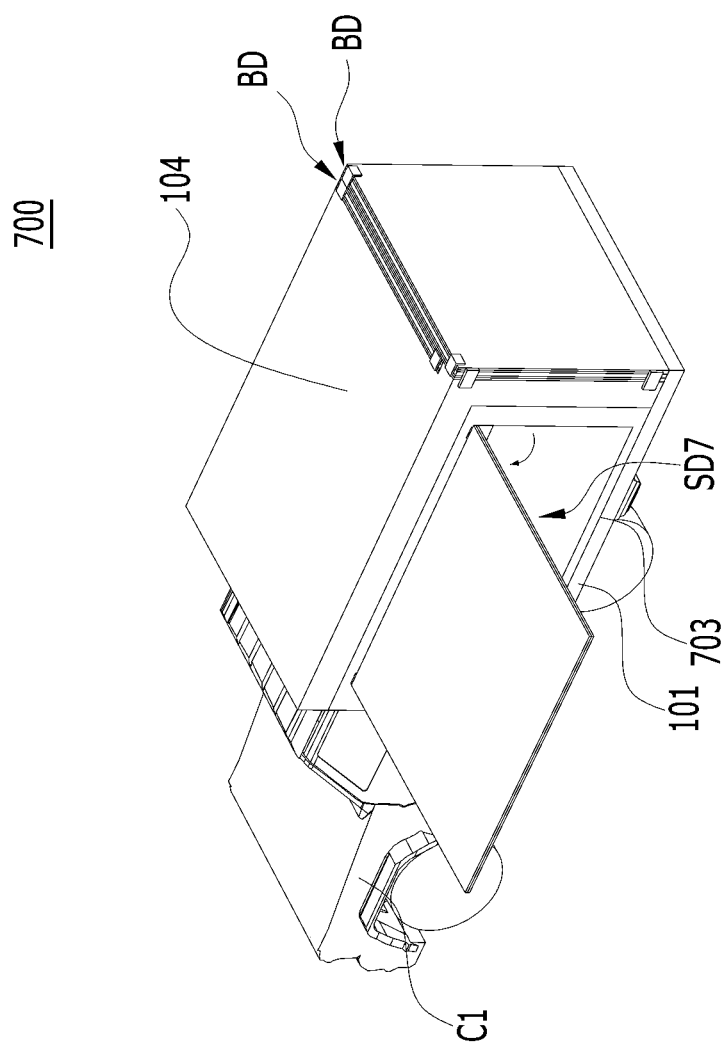
Figure 7C:
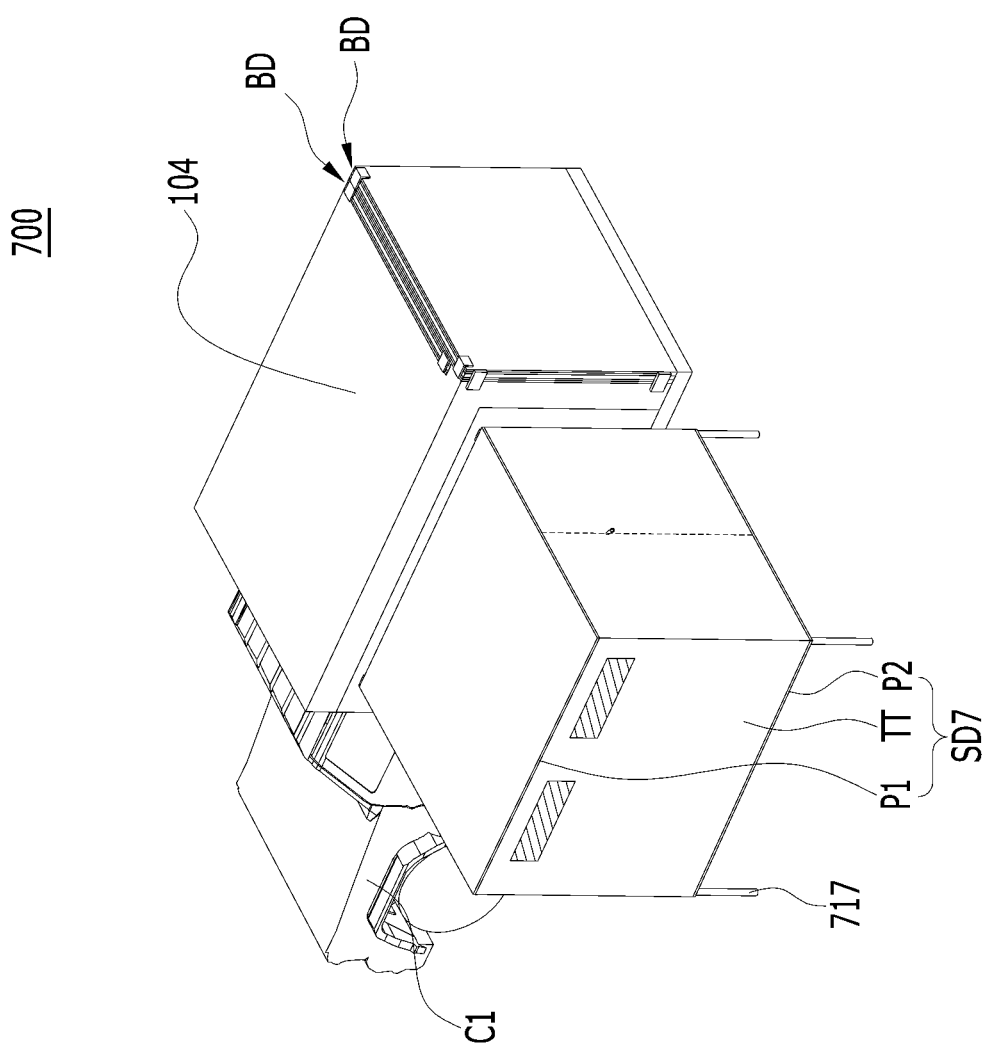

FIGS. 7a to 7c show a tent 700 for a vehicle according to another embodiment of the present invention.

The tent 700 is similar to the tent 100 in FIGS. 1A to 1I; however, a side door SD7 of the tent 700 opens upward.

According to FIGS. 7a to 7c, a top edge of the side door SD7 is connected to a body frame 703 through a hinge 707. The side door D7 comprises a first board P1, a second board P2, and a tent cloth TT. When the side door SD7 opens, the first and the second board 705A, 705B can pivot upward around the hinge 707 to the point that the first and the second board 705A, 705B are perpendicular to the door frame 703. Then, the first and the second board P1, P2 are detachable each other in a vertical direction to form a space defined by the first and the second board P1, P2 and the tent cloth TT therebetween.

According to the present invention, the tent and the vehicle can provide enough spaces and easy access without additional bulky equipment.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:
1. A tent for a vehicle, the tent comprising:
a body frame connected to the vehicle and defining an interior space;

at least one door introducing the interior space, the door comprising:
a door frame;
a first board located on one side of the door frame, and a second board located on the other side of the door frame, and
wherein the first and the second board are connected to each other via a connecting member over one edge of the door frame, and
wherein the first board comprises a first subboard, a second subboard, and a first tent cloth connecting between the first and the second subboard along the edge of the first and the second subboard.

2. The tent of claim 1,
wherein the at least one door comprises a side door and a back door.

3. The tent of claim 2,
wherein the body frame comprises a side column and a rear column, and
wherein the side door is connected to the side column, and the back door is connected to the rear column.

4. The tent of claim 1,
wherein the body frame comprises a fixed body and an extendable roof located on the fixed body, and
wherein the fixed body includes a rail on the top, and the extendable roof can be extended backward through the rail.

5. The tent of claim 4,
wherein the at least one door comprises a back door, and the back door is fixed on the rear side of the extendable roof.

6. The tent of claim 4,
wherein the extendable roof comprises:
a plane part that is positioned on the top side of the fixed body, and
a column part that is positioned at the rear side of the fixed body, and
wherein the tent further comprises a second tent cloth that is connected to the bottom side of the plane part.

7. The tent of claim 1,
wherein when the door opens, the first board is adjustable to form a first space defined by the first and the second subboard and the tent cloth therebetween.

8. The tent of claim 7,
wherein the connecting member connects between the first and the second board over the top edge of the door frame, and
wherein when the door opens, the first board can pivot upward around the connecting member to the point that the first board is perpendicular to the door frame, and the first and the second subboard are detachable each other in a vertical direction.

9. The tent of claim 8,
wherein the second board comprises a third subboard, a fourth subboard, and a second tent cloth connecting between the third and the fourth subboard along the edge of the third and the fourth subboard,
wherein the second board is adjustable to form a second space defined by the third and the fourth subboard and the tent cloth therebetween, and
wherein the second board can pivot upward around the connecting member to the point that the second board is perpendicular to the door frame, and the third and the fourth subboard are detachable each other in a vertical direction.

10. The tent of claim 9,
wherein the first and the second space can be communicated through the door frame.

11. The tent of claim 7,
wherein the connecting member connects between the first and the second board at the bottom edge of the door frame, and
wherein when the door opens, the first board can pivot downward around the connecting member to the point that the first board is perpendicular to the door frame, and the first and the second subboard are detachable each other in a vertical direction to form a second space defined by the first and the second subboard and the tent cloth therebetween.

12. The tent of claim 1,
wherein the door frame further comprises a height adjusting member that adjusts heights of the first and the second board.

13. The tent of claim 12,
wherein the at least one door comprises at least two side doors located on both lateral side of the body frame and at least one back door located on back side of the body frame,
wherein levels of the side doors and the back door are higher than that of the body frame, and
wherein a containing space is defined by the side doors and the back door on a top of the body frame.

14. The tent of claim 12,
wherein the first tent cloth is compressed by an attachable member that attached to outside of the first tent cloth between the first and the second subboard.

15. The tent of claim 1,
wherein the tent further comprises a trailer on which the body frame is mounted, and the trailer is connected to the vehicle.

16. A vehicle comprising:
a body frame defining an interior space, and
at least one door introducing the interior space, the door comprising:
a door frame;
a first board located on one side of the door frame, and a second board located on the other side of the door frame, and
wherein the first and the second board are connected to each other via a connecting member over one edge of the door frame,
wherein the first board comprises a first subboard, a second subboard, and a first tent cloth connected between the first and the second subboard along the edge of the first and the second subboard.

17. The tent of claim 16,
wherein the body frame comprises a fixed body and an extendable roof located on the fixed body, and
wherein the fixed body includes a rail on the top, and the extendable roof can be extended backward through the rail.

18. The tent of claim 17,
wherein the at least one door comprise a back door, and the back door is fixed on the rear side of the extendable roof.

19. The tent of claim 17,
wherein the extendable roof comprises:
a plane part that is positioned on the top side of the fixed body, and
a column part that is positioned at the rear side of the fixed body, and
the tent further comprises a second tent cloth that is connected to the bottom side of the plane part.

20. A tent for a vehicle comprising:
- a body frame connected to the vehicle and defining an interior space;
- a door that opens upward, that introduces the interior space, that has an outer surface exposed toward the outside and an inner surface opposite to the outer surface and exposed toward the interior space when the door is closed, and comprising:
  - a first subboard connected to the body frame through a connecting member that is located on the top of the first subboard and having the outer surface as one surface of the first subboard and a first surface opposite to the outer surface as the other surface of the first subboard,
  - a second subboard having the inner surface as one surface of the second subboard and a second surface opposite to the inner surface as the other surface of the second subboard, wherein the first surface of the first subboard and the second surface of the second subboard face each other whether the door is open or closed, and
  - a tent cloth interposed and connected between the first surface of the first subboard and the second surface of the second subboard along the edge of the first and the second subboard, and
- wherein when the door opens, the set of the first and the second subboard and the tent cloth of the door can pivot upward around the connecting member to the point that the set of the first and the second subboard and the tent cloth is perpendicular to the body frame, and the first and the second subboard are detachable each other in a vertical direction and form a space defined by the first and the second subboard and the tent cloth therebetween.

* * * * *